United States Patent
Sato et al.

(10) Patent No.: US 7,210,021 B2
(45) Date of Patent: Apr. 24, 2007

(54) CACHE CONTROL PROGRAM

(75) Inventors: Tomoaki Sato, Nagoya (JP); Kenji Tonami, Kasugai (JP); Yuji Kato, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 681 days.

(21) Appl. No.: 10/748,659

(22) Filed: Dec. 31, 2003

(65) Prior Publication Data

US 2004/0221089 A1 Nov. 4, 2004

(51) Int. Cl.
*G06F 12/00* (2006.01)
(52) U.S. Cl. .................................. 711/220; 711/118
(58) Field of Classification Search ................ 711/118, 711/220
See application file for complete search history.

(56) References Cited

U.S. PATENT DOCUMENTS 6,134,558 A * 10/2000 Hong et al. ............. 707/103 R

2003/0188021 A1* 10/2003 Challenger et al. ......... 709/246

FOREIGN PATENT DOCUMENTS

| JP | 10-301880 | 11/1998 |
|----|-----------|---------|
| JP | 2001-318902 | 11/2001 |

* cited by examiner

*Primary Examiner*—Reba I. Elmore
(74) *Attorney, Agent, or Firm*—Staas & Halsey LLP

(57) ABSTRACT

A cache control program that reduces cache control load. The cache control programs functions as a multi-bind cache (MBC) manager of a file server. The MBC manager manages a cache memory as a plurality of extents. The MBC manager generates cache IDs including object identifications for identifying the objects of each hierarchical level. Further, the MBC manager generates a cache header table indicating the relation of the cache IDs and the cache extents for each hierarchical level.

10 Claims, 22 Drawing Sheets

CACHE CONTROL PROGRAM

BACKGROUND OF THE INVENTION

The present invention relates to a cache control program.

A plurality of client machines are connected to a network system. A file server is connected to the network system to share files. A client machine accesses the file server to use programs and data generated by other client machines. Due to progress in the client machine capability, there is a demand for increasing the speed for accessing files, or increasing the file server capability.

FIG. 1 is a diagram showing the concept of file recording by a file server 1.

The file server 1 includes a disk device 2. A plurality of files 3 are stored in the disk device 2. The disk device 2 manages the recorded data in a predetermined number of blocks. The file server 1 divides a file 3 into a plurality of blocks 4, each including a predetermined amount of data, and manages the position of each block 4 with recording position information. In response to a request from a client machine, the file server 1 sends a file 3, which includes plural blocks 4, to the client machine. The file server 1 then divides the file received from the client machine into a plurality of blocks and stores the blocks in the disk device 2.

The file server 1 is provided with a cache manager for responding to data access at high speed. The cache manager copies files accessed by the client machine into a memory having an input/output speed that is higher than that of the disk device 2. Subsequently, when the file 3 stored in the disk device 2 is accessed, the cache manager reads the copy of the file 3 stored in its memory and provides the copy to the client machine.

FIG. 2 schematically shows the file server 1. The file server 1 includes a communication control manager 11, a page cache manager 12, a file system 13, a buffer cache manager 14, and a block device 15. The communication control manager 11 includes a communication buffer 16, which is required for data transfer with the client machine 5. The page cache manager 12 and the buffer cache manager 14 include cache memories 17 and 18, respectively.

The page cache manager 12 improves the input/output efficiency of the file 3 by the client machine 5. The buffer cache manager 14 improves the input/output efficiency of the blocks 4 by the disk device 2.

The file 3 transferred from the client machine 5 is stored in the disk device 2 via the communication buffer 16 and the two cache memories 17 and 18. More specifically, the communication control manager 11 receives the file 3 transmitted from the client machine 5 and stores the file 3 in the communication buffer 16. The file system 13 manages the file 3 with information such as a file ID. The page cache manager 12 stores the blocks 4 configuring the file 3 in the cache memory 17. Each block 4 is associated with its file ID and an offset, which indicates its stored position.

The file system 13 has a section for storing files in the disk device 2. The block device 15 accesses the designated disk device 2 in blocks. The buffer cache manager 14 stores the blocks that are to be stored in the disk device 2 in the cache memory 18. Each block 4 is associated with the device ID of the disk device 2 and an offset, which indicates the position of the block in the disk device 2.

The position for accessing the file server 1 will now be discussed with reference to FIG. 3. In response to an access request for a file 3, the file server 1 accesses a block 4 configuring the file 3 stored in the cache memory 17 in accordance with the file ID and the offset.

When the block is not stored in the cache memory 17, the file server 1 accesses the disk device 2, reads the block 4 from the disk device 2, and stores the block 4 in the cache memory 18 of the buffer cache manager 14 and the cache memory 17 of the page cache manager 12. The file server 1 provides the read block 4 to the client machine 5. Then, the buffer cache manager 14 associates the read block 4 with the stored cache memory 18 and the stored section of the disk device 2. The page cache manager 12 associates the block 4 stored in the cache memory 17 with a section of a file.

The file server 1 of the prior art requires the two cache memories 17 and 18 that store substantially the same blocks 4. Thus, the file server 1 requires a cache memory having a cache memory capacity that is greater than (by two times) the cache memory capacity indicated in a specification.

Further, the information stored in the two cache memories 17 and 18 must be substantially the same. Thus, data must be copied for the cache memories 17 and 18. Further, data must be copied in the same manner in the cache memory 17, which is managed by the page cache manager 12, and the communication buffer 16. The copying of cache data results in load that delays the input/output characteristics (response speed) of the file server 1.

SUMMARY OF THE INVENTION

One aspect of the present invention is a cache control program to be executed by a file controller including a disk device that records a plurality of objects accessed by a client machine and a cache section that stores a copy of at least one of the objects. When the client machine tries to access one of the objects recorded in the disk device, the file controller sends the copy of said object to the client machine if the copy of said object is in the cache section. Each object is one of a primary object, a secondary object, and a tertiary object. The tertiary object is configured by at least one secondary object, the secondary object is configured by at least one primary object, and the primary, secondary, and tertiary objects configure different hierarchical levels. The cache control program controls the file controller. The cache control program when executed includes the steps of managing the cache section as a plurality of cache extents, and generating a plurality of cache IDs, each including a hierarchical level of an object and an object identification used to identify the objects of each hierarchical level from each other. The cache control program when executed further includes the steps of generating a cache header table indicating the relation of the cache IDs and the cache extents in each hierarchical level, and searching the cache header table when the client machine tries to access one of the objects recorded in the disk device with the cache ID and the key of said object. The cache header table contains cache headers that hold the cache IDs and a plurality of keys, each being unique and used for one of the cache IDs.

A further aspect of the present invention is a cache control method performed by a file controller including a disk device that records a plurality of objects accessed by a client machine and a cache section that stores a copy of at least one of the objects. When the client machine tries to access one of the objects recorded in the disk device, the file controller sends the copy of said object to the client machine if the copy of said object is in the cache section. Each object is one of a primary object, a secondary object, and a tertiary object. The tertiary object is configured by at least one secondary object, the secondary object is configured by at least one primary object, and the primary, secondary, and tertiary objects configure different hierarchical levels. The cache control method includes the steps of managing the cache section as a plurality of cache extents, and generating a plurality of cache IDs, each including a hierarchical level of an object and an object identification used to distinguish the objects of each hierarchical level from each other. The cache control method further includes generating a cache header table indicating the relation of the cache IDs and the cache extents in each hierarchical level. The cache header table contains cache headers that hold the cache IDs and a plurality of keys, each being unique and used for one of the cache IDs. The cache control method further includes searching the cache header table when the client machine tries to access one of the objects recorded in the disk device with the cache ID and the key of said object.

A further aspect of the present invention is a file controller for use with a client machine. The file controller includes a disk device that records a plurality of objects accessed by the client machine and a cache section that stores a copy of at least one of the objects. When the client machine tries to access one of the objects recorded in the disk device, and the copy of said object is sent to the client machine if the copy of said object is in the cache section. Each object is one of a primary object, a secondary object, and a tertiary object. The tertiary object is configured by at least one secondary object. The secondary object is configured by at least one primary object. The primary, secondary, and tertiary objects configure different hierarchical levels. The file controller includes control logic which when executed performs steps including managing the cache section as a plurality of cache extents, and generating a plurality of cache IDs, each including a hierarchical level of an object and an object identification used to identify the objects of each hierarchical level from each other. Further, executed steps include generating a cache header table indicating the relation of the cache IDs and the cache extents in each hierarchical level, and searching the cache header table when the client machine tries to access one of the objects recorded in the disk device with the cache ID and the key of said object. The cache header table contains cache headers that hold the cache IDs and a plurality of keys, each being unique and used for one of the cache IDs.

A further aspect of the present invention is a recording medium encoded with a cache control program for execution by a file controller including a disk device that records a plurality of objects accessed by a client machine and a cache section that stores a copy of at least one of the objects. When the client machine tries to access one of the objects recorded in the disk device, the file controller sends the copy of said object to the client machine if the copy of said object is in the cache section. Each object is one of a primary object, a secondary object, and a tertiary object. The tertiary object is configured by at least one secondary object. The secondary object is configured by at least one primary object. The primary, secondary, and tertiary objects configuring different hierarchical levels. The cache control program controls the file controller. The cache control program when executed performs the steps including managing the cache section as a plurality of cache extents, generating a plurality of cache IDs, each including a hierarchical level of an object and an object identification used to identify the objects of each hierarchical level from each other, and generating a cache header table indicating the relation of the cache IDs and the cache extents in each hierarchical level. The cache header table contains cache headers that hold the cache IDs and a plurality of keys, each being unique and used for one of the cache IDs. The cache control program when executed further performing the step of searching the cache header table when the client machine tries to access one of the objects recorded in the disk device with the cache ID and the key of said object.

A further aspect of the present invention is a cache control method for a file transferred through a network between a client machine and a plurality of file servers. Each of the file servers includes storage for storing the file and a cache memory having a plurality of cache extents. The method including dividing the file in accordance with the size of the file into a plurality of objects, dispersing each of the objects to one of the file servers, dividing the corresponding object into a plurality of disk blocks in each file server and storing the disk blocks in the storage of the file server, copying at least one of the disk blocks related with the file in each file server, when the file is read, onto at least one cache extent of the cache memory of the file server while generating a table for binding the cache extent of at least one of the disk blocks, the objects, and the file to one another, referring to the table with each file server to check whether the cache memory of each file server has a cache extent bound to the file when the client machine tries to access the file, and accessing the cache extent with each server when there is a cache extent bound to the file.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
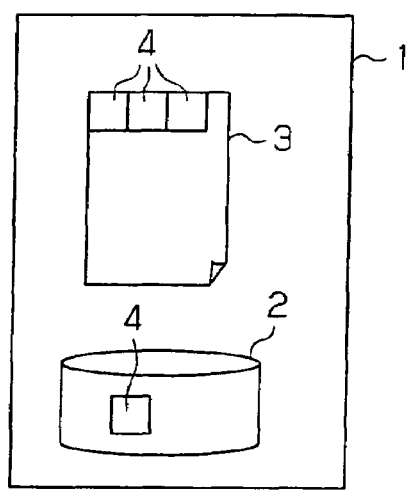
FIG. 1 is a diagram showing the concept of file recording with a file server in the prior art.

Cache control according to a preferred embodiment of the present invention will now be discussed with reference to FIGS. 4 to 31.

A network system 20 will first be described with reference to FIG. 5. The network system 20 includes client machines 21, 22, and 23 and file servers 24, 25, and 26 that are connected to one another by a network 27. The file servers 24, 25, and 26 each correspond to a file controller.

Each of the file servers 24 to 26 includes a disk device 35. The disk device 35 stores a file (application program and data) for executing one or more processes, such as task processing for customer management or computation processing for scientific calculations. The file servers 24 to 26 each store an operating system (OS) program for providing (transmitting) the file requested by the client machines 21 to 23 to the origin of the request.

Figure 6:
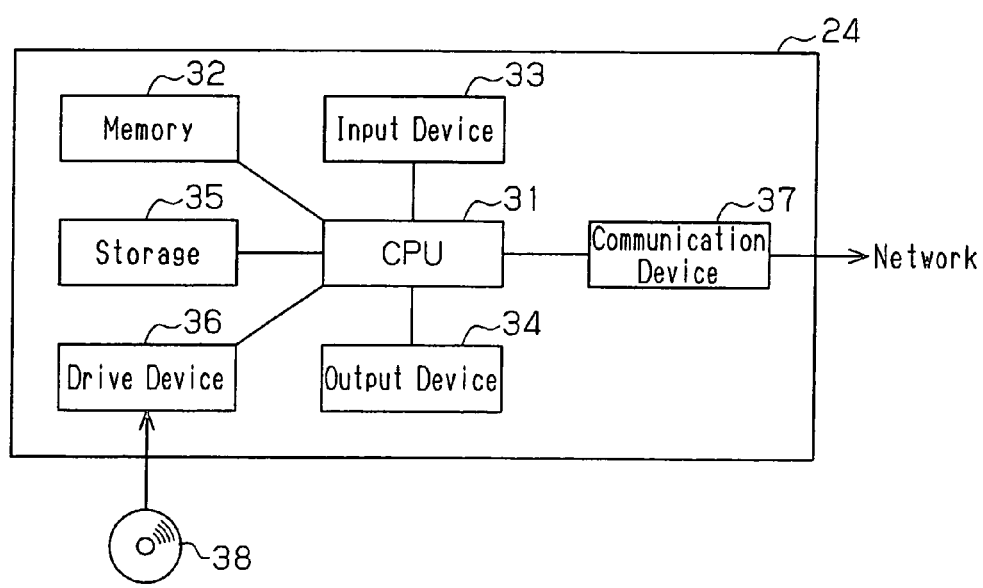
FIG. 6 is a schematic diagram of a file server in the preferred embodiment.

FIG. 6 is a block diagram schematically showing the hardware configuration of the file server 24. The functions of the file servers 24, 25, and 26 and the client machines 21, 22, and 23 are realized by computer programs that may be executed by a general-purpose computer.

The file server 24 includes a central processing unit (CPU) 31, a memory 32, an input device 33, an output device 34, a disk device (storage device) 35, a drive device 36, and a communication device 37.

The CPU 31 stores and executes a program that provides various functions in the memory 32, and reads log data or performs operation analysis. The memory 32 normally includes a cache memory, a system memory, and a display memory.

The input device 33 includes a keyboard and mouse, which are used by a user to input requests and instructions, a display, such as a visual display terminal or a monitor, for showing a service page or an analysis result, and a printer for printing an analysis result.

The disk device 35 may be, for example, a magnetic disk device, an optical disc device, or a magneto-optical disc device. The input/output speed of the disk device 35 is lower than that of the memory 32. The above program and data is stored in the disk device 35. In accordance with an instruction from the input device 33, the CPU 31 transfers the program file and the data file to the memory 32 and executes the program file and data file.

The drive device 36 accesses the information recorded on a recording medium 38. The recording medium 38 may be a memory card, a flexible disk, an optical disc (e.g., CD-ROM, CD-R, DVD-ROM, DVD-R, DVD-RW, and DVD-RAM), a magneto-optical disc (e.g., MO and MD), or any computer readable recording medium. The above program, data, and cache control program, which are stored on the recording medium 38, are loaded from the memory 32 and used when necessary.

The communication device 37 is used for connection with the network 27 and performs various data conversions to enable communication with the other devices 21 to 23, 25, and 26, or to enable transmission and receiving of programs and data. The CPU 31 receives the above programs and data from a database of an external information provider connected to the network 27 and loads the program and data to the memory 32.

Figure 4:
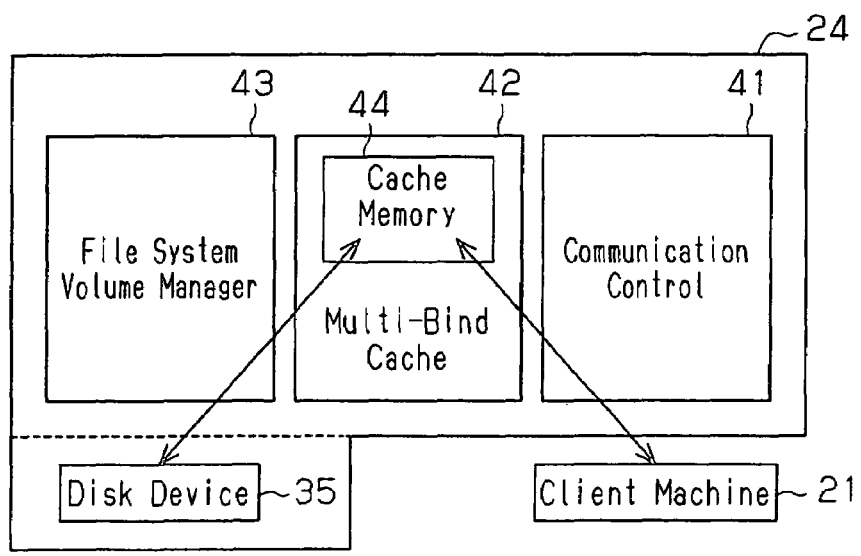
FIG. 4 is a block diagram showing the functions of a file server according to a preferred embodiment of the present invention.

FIG. 4 is a block diagram showing the functions of the file server 24. The other file servers 25 and 26 are substantially identical to the file server 24.

The file server 24 includes a communication control manager 41, a multi-bind cache (MBC) manager 42, and a file system volume manager (FVM) 43. The MBC manager 42 controls the cache memory 44 and increases the data input/output efficiency with respect to the client machine 21. The cache memory 44 is included in the memory 32 of FIG. 6.

The functions of the file server 24 are realized by a program executed by the CPU 31 of FIG. 6. (including a cache control program for controlling the cache memory 44).

The file transferred from the client machine 21 is stored in the disk device 35 via the cache memory 44. The FVM 43 obtains a section in the disk device 35 for storing the file. The FVM 43 accesses the designated disk device 35 in blocks.

More specifically, the communication control manager 41 stores the file received from the client machine 21 in the cache memory 44. The MBC manager 42 divides the files stored in the cache memory 44 into objects in accordance with the size of the file. The MBC manager 42 further divides each of the divided objects into a plurality of disk blocks. An object (secondary object) is configured from at least one disk block (primary object), and a file (tertiary object) is formed from at least one secondary object. The cache memory 44 stores information having such a hierarchic structure (file, object, and disk block).

The MBC manager 42 manages cache sections such as the cache memory 44 as a group of extents. Each extent is a linear area represented by an offset and a length. Further, each extent is one of the regions in a theoretically continuous storage space. When the cache section is the cache memory 44, each extent is referred to as a cache extent (C-ext). When the cache section is a storage 65, each extent is referred to as a storage extent (S-ext). The MBC manager 42 associates (binds) the files, objects, and disk blocks with cache extents using a table.

The MBC manager 42 binds a cache extent with objects having a plurality of hierarchies and manages the binding in a cache header table (CHT) provided for each hierarchy. More specifically, the MBC manager 42 manages the objects of a predetermined hierarchic level and a cache header table corresponding to the cache extent that is bound with the object. Further, the MBC manager 42 binds the cache extent bound with the object to an upper rank object and manages the binding with the cache header table.

The MBC manager 42 binds the cache extent bound with the disk block (primary object) to a cache extent corresponding to a secondary object (object) bound with a disk block (primary object) using a cache header table. Further, the MBC manager 42 binds the cache extent to a cache extent corresponding to the tertiary object (file). The MBC manager 42 manages the binding of the disk block and the cache extent, the object and the cache extent, and the file and the cache extent in a corresponding cache header table.

The MBC manager 42 generates a cache ID configured by an object identification that distinguishes objects from each other in each hierarchy level. The cache header table holds the cache ID and a unique key.

The MBC manager 42 searches the cache header table based on the cache ID and the key bound with the object (file, object, disk block) that the client machine 21 is trying to access to enable access to the cache extent corresponding to the object of each hierarchic level.

Figure 2:
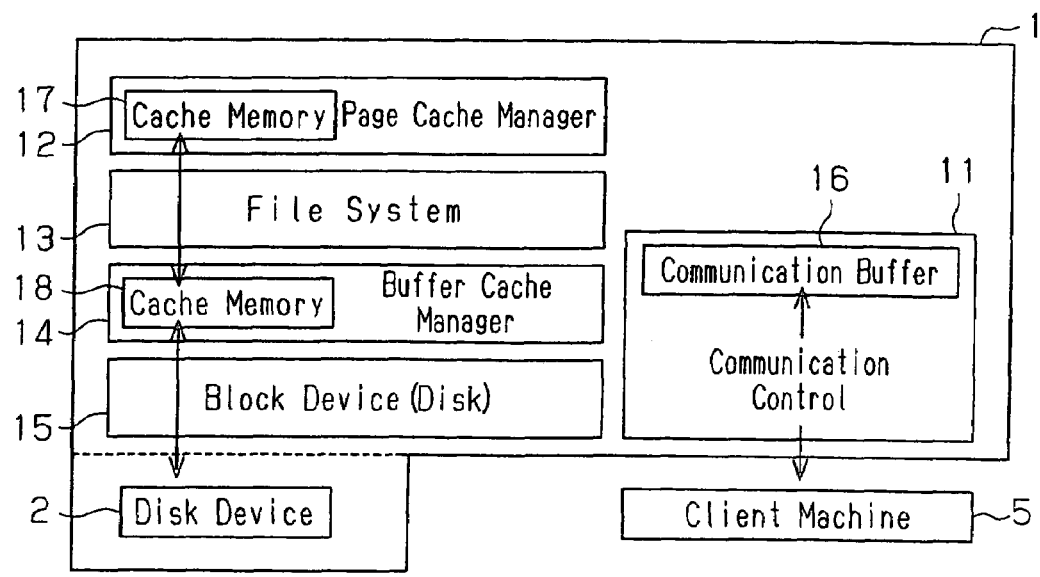
FIG. 2 is a diagram showing the functions of a file server in the prior art.
Figure 3:
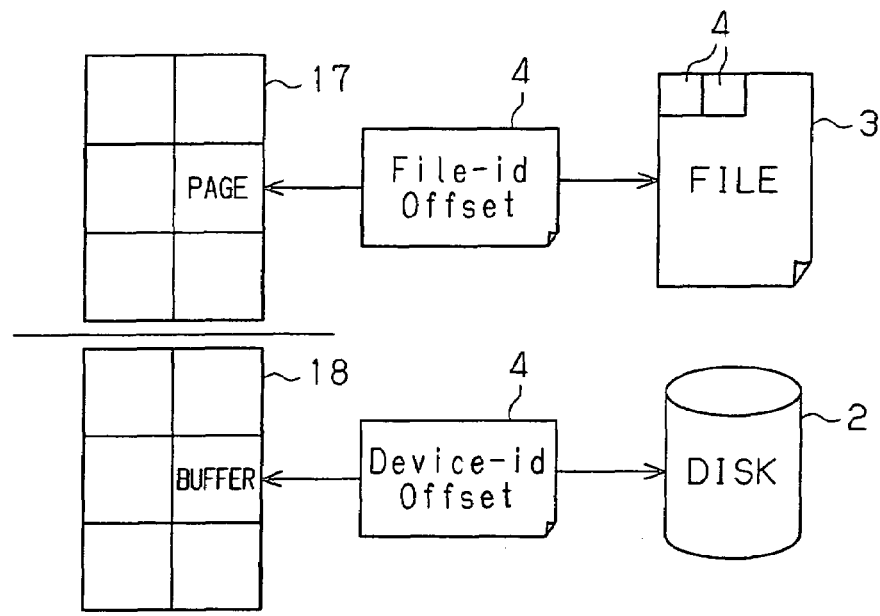
FIG. 3 is a diagram showing the procedures for accessing the file server in the prior art.

The MBC manager 42 binds a cache extent with an object shared by the file, object, and disk block. As a result, the single cache memory 44 is used in place of the prior art cache memories 17 and 18 shown in FIG. 2. This decreases the cache control load since data transfer (copy) between the cache memories 17 and 18, and data transfer (copy) between the cache memory 18 and the communication buffer 16 are not necessary. Further, the cache memory 44 has the functions of the two prior art cache memories 17 and 18 and the communication buffer 16 and does not have to have a large memory capacity like in the prior art. In other words, the capacity of the cache memory 44 may be the same as the total memory capacity of the prior art cache memories 17 and 18 and the communication buffer 16. This increases the number of the cache extents of the cache memory 44, decreases cache errors, and increases the response speed with respect to the client machine 21.

The FVM 43 manages the logical volume configured by one or more of the file servers 24 to 26 that are mounted by the client machines 21 to 23. The logical volume is a volume set to handle a plurality of disk devices as a single disk device. For example, referring to FIG. 7, the client machine 21 may mount a single logical volume configured by the two file servers 24 and 25, store the file 51 in the logical volume, and read the logical volume from the file 51.

Figure 7:
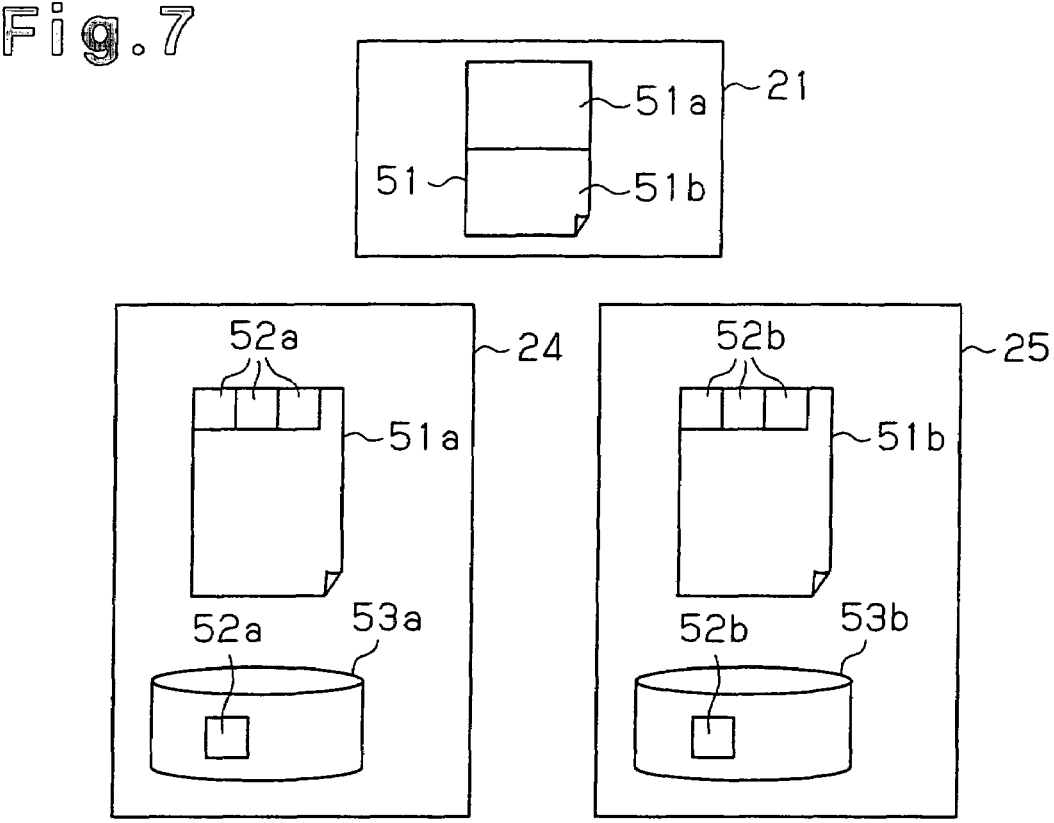
FIG. 7 is a diagram showing file recording with the file server.

FIG. 7 shows a file 51 configured by two objects 51a and 51b. The file 51 is stored in a logical volume configured by the two file servers 24 and 25. In this case, the file 51 is dispersed by the two file servers 24 and 25, and the objects 51a and 51b are respectively managed by file servers 24 and 25. The number of objects is related to the configuration (node, number of file servers) of the volume mounted to store the files configured by the objects.

The first object 51a is configured by a plurality of disk blocks 52a. The fist file server 24 stores the disk blocks 52a in the disk device 53a (the disk device 35 of FIGS. 4 and 6). The second object 51b is configured by a plurality of disk blocks 52b. The second file server 25 stores the disk block 52b in the disk device 53b.

The MBC manager 42 of the file servers 24 and 25 stores the number of a device connected to the network 27 (i.e., the identification number of a node in a specific domain) in the cache header table. This binds the files, objects, and disk blocks stored in the devices that are connected to one another through the network 27 with cache extents.

When the client machine 21 accesses the files 51 stored in this manner, in response to the access of the client machine 21, the two file servers 24 and 25 respectively send the disk blocks 52a and 52b to the client machine 21.

The objects 51a and 51b dispersed by the file servers 24 and 25 are parallel-transferred from the file servers 24 and 25 to the client machine 21. Thus, in comparison with the prior art method that stores the file 51 in a single file server, the substantial file transfer speed (the time from when access is started to when the client machine reads all of the data in the file 51) is shortened.

In the case of FIG. 7, when the file is input or output, the cache memories 44 of the two file servers 24 and 25 are used. Accordingly, the memory capacity used for the cache of the file 51 is two times that of the prior art. In this manner, the substantial memory capacity used for the cache increases in accordance to the numbers of the file servers 24 and 25 mounted to the client machine 21. This improves the file input/output capacity.

Figure 5:
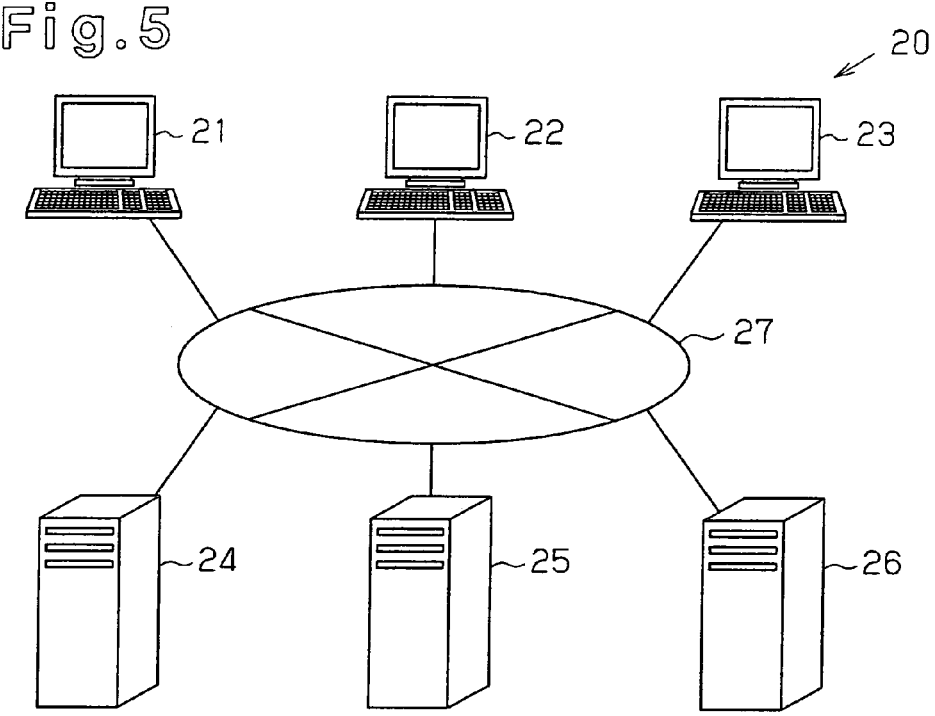
FIG. 5 is a schematic diagram of a network system in the preferred embodiment.

The client machines 21 to 23 and the file servers 24 to 26 shown in FIG. 5 may each be a communication device provided with a remote direct memory access (RDMA) transfer function, or a hardware function for directly transferring data between the memories of two machines via a network. This results in the advantage of high speed for the communication device.

The MBC manager 42 will now be discussed.

The MBC manager 42 unifies the cache management unit and the data management unit of each section management level to "extent". The MBC manager 42 uses a table to bind the cache extent with at least two of a file, an object, and a disk block. The binding of the cache extent enables mutual searching of the data management subject. The table is managed by a map having a B-tree configuration.

The MBC manager 42 generates five types of tables, that is, a cache extent table (CET), a cache header table (CHT), a storage extent table (SET), an object table (OT), and a file table (FT) in the memory 32 of FIG. 6. The five types of tables have the same format.

Figure 8:
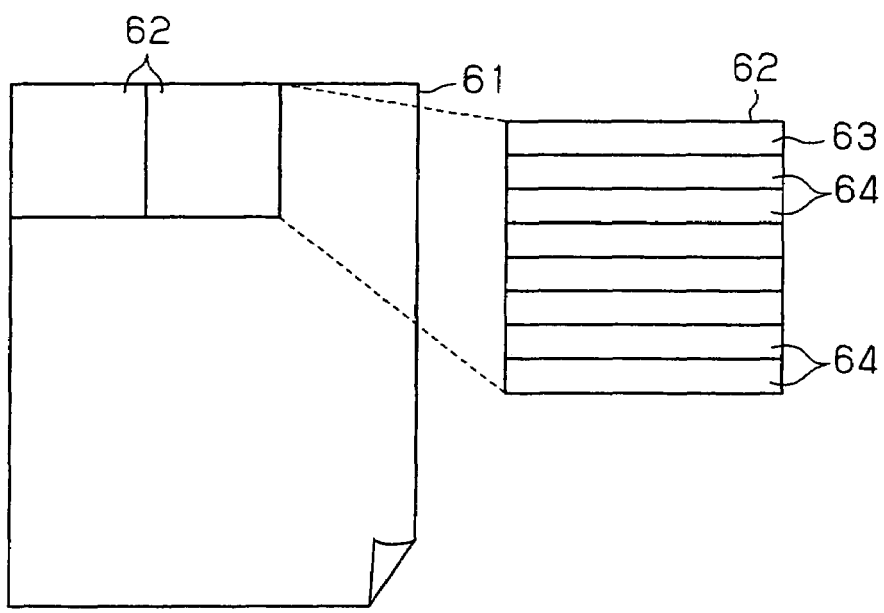
FIG. 8 is a schematic diagram showing the configuration of a table.

The configuration of the table will now be discussed with reference to FIG. 8. The table of FIG. 8 is only one example and the table is not limited to such a configuration.

A table 61 is configured by a group of blocks 62 having a fixed length. Each block 62 has a size optimal for input and output of a disk device and for network transfer. Each block 62 is configured by one or more control entries 63 and a data group having fixed lengths, including a plurality of data entries 64.

The control entry 63 holds bit map data that manages the usage condition of the data entries 64 in the same block 62.

Each data entry 64 has a data set referred to as an extent. Each data set has an offset, a length, and a value. The data entry of the CET and the SET includes an extent. The data entries of the CHT, the OT, and the FT is an array configuration of elements including a plurality of extents. The data entries included in each table are the materials of the nodes configuring the B-tree. The elements configuring each data entry of the CHT, the OT, and the FT are sorted by the offset of the included extent. An extent having a value that is zero is referred to as a null extent. An exclusive index is given to each data index (idx). That is, the index specifies a data entry.

Figure 9:
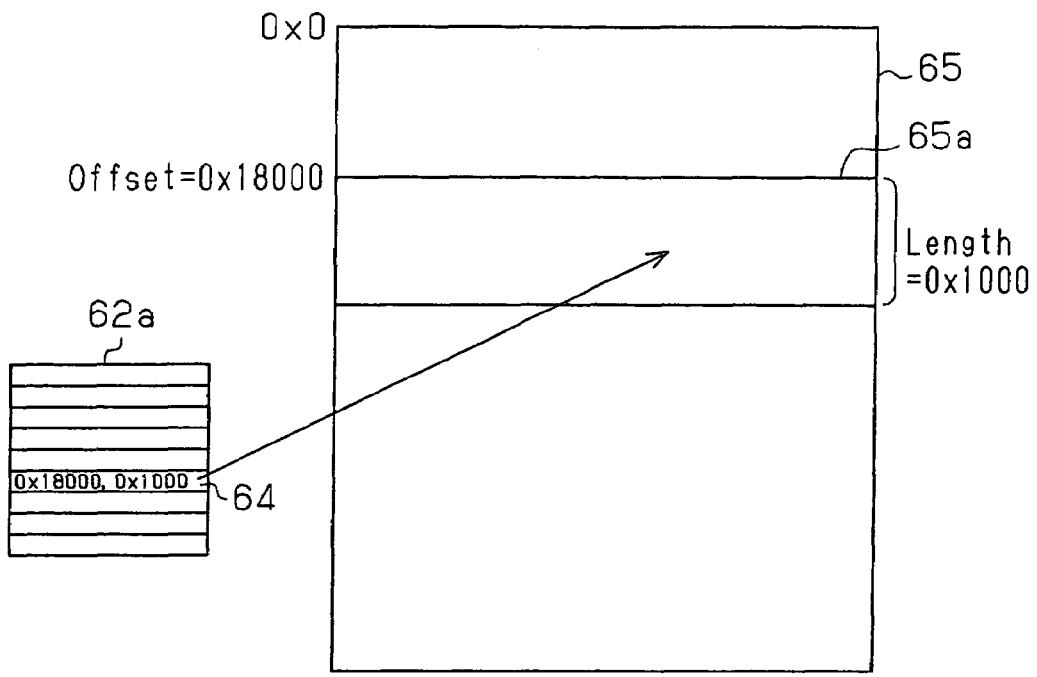
FIG. 9 is a diagram showing the relationship between a data entry and an extent.

The data of the extents included in each table differs depending on the purpose of the table. For example, the extent included in the data entry of the CET and the SET has data representing a cache, which is material, and a storage extent (cache extent and storage extent). FIG. 9 shows a storage extent 65a of the storage 65. The storage extent 65a is the section represented by offset 0x18000 and length 0x1000. A data entry 64 of a block 62a configuring a CET holds an extent including information representing the offset and the length of the storage extent 65a (0x18000, 0x1000).

FIG. 9 describes the relationship between the data entry and the storage extent 65a. However, the relationship is the same when the binding subject is a cache. That is, a data entry of a block configuring an SET holds the offset and length of an extent, which is information for designating a cache extent.

The MBC manager 42 of FIG. 4 generates five types of maps, which are a free storage extent map (FSEM), a storage extent map (SEM), an object map (OM), a free cache extent map (FCEM), and a cache extent map (CEM) in the memory 32 of FIG. 6. The five types of maps have the same configuration.

Each map is configured by the data entry of a corresponding table. The map manages a group of extents and has a B-tree configuration that uses an offset as a key.

Figure 10:
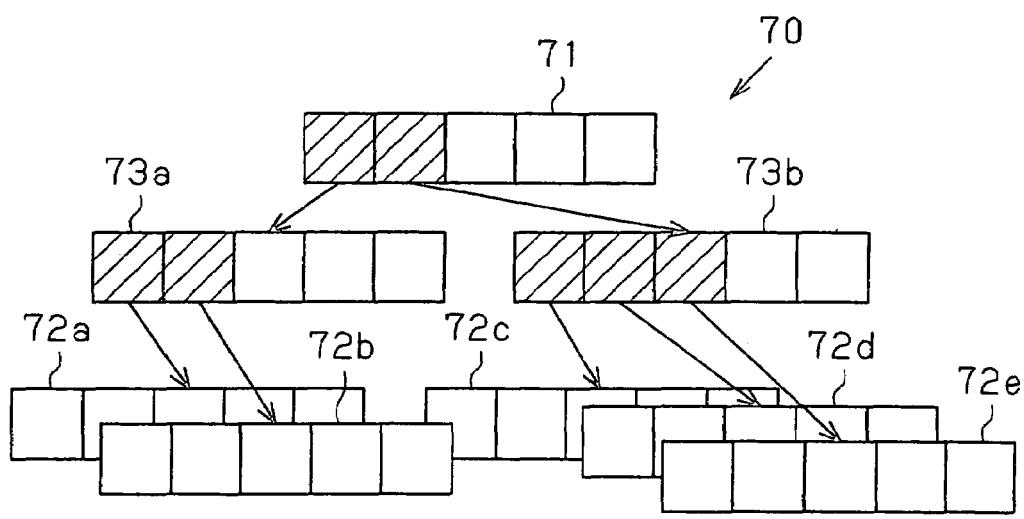
FIG. 10 is a schematic diagram showing the configuration of a map.

The configuration of a map will now be discussed with reference to FIG. 10. FIG. 10 shows only one example of a map. Thus, a map is not limited to such structure.

The map 70 has a root node 71 at the uppermost rank and leaf nodes 72a to 72e at the terminal ends. The leaf nodes 72a to 72e manage actual data.

The number of leaf nodes 72a to 72e corresponds to the actual data amount (file size). To bind the leaf nodes 72a to 72e with a root node 71, branch nodes 73a and 73b are arranged between the root node 71 and the leaf nodes 72a to 72e. The nodes 71, 72a to 72e, 73a, and 73b are formed by data entries in the above table.

The root node 71 includes two extents (inclined lines) bound with the lower rank branch nodes 73a and 73b and three blank extents. The branch node 73a includes two extents respectively related with the lower rank leaf nodes 72a and 72b and three blank extents. The branch node 73b includes three extents respectively related with the lower rank leaf nodes 72c, 72d, and 72e and two blank extents.

That is, the leaf nodes 72a to 72e hold extents representing material extents (cache extent or storage extent). The branch node and the root node 71 hold extents representing a group of leaf nodes, a group of branch nodes, or a group of leaf nodes and branch nodes. The holding of a branch node with a root node and the holding of a root node with a branch node are performed with the offset and length of the range covered by extents in each map and the index of the leaf.

Figure 11:
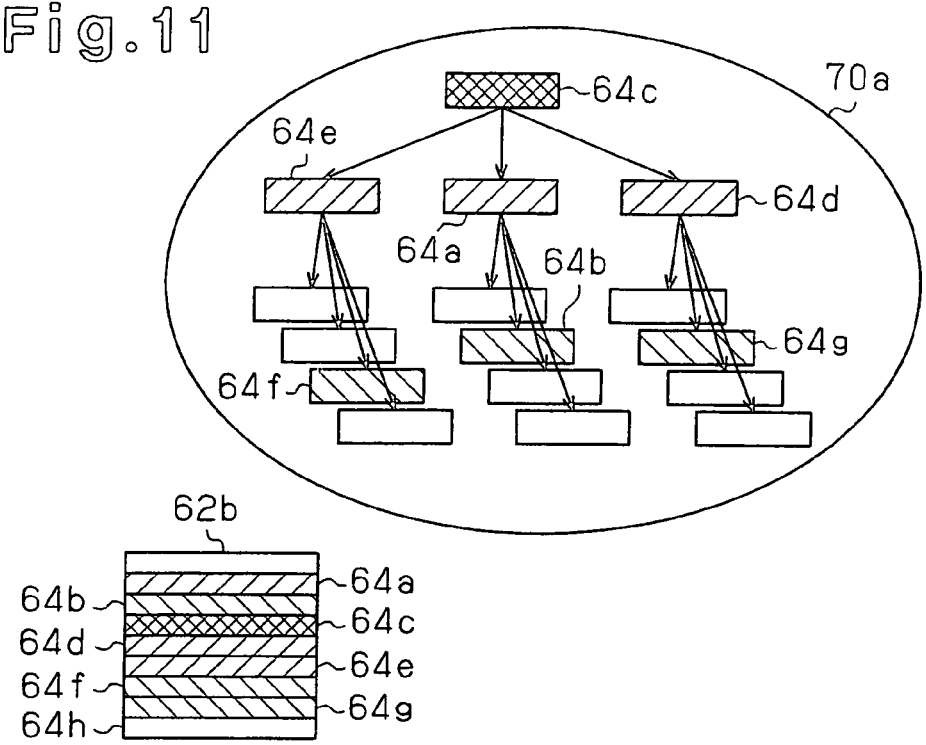
FIG. 11 is a diagram showing the relationship between the data entry and the extent.

The data entry is a map, or node of the B-tree. The node theoretically configures a B-tree. For example, as shown in FIG. 11, a block 62b configuring any one of the tables includes a plurality of data entries 64a to 64h. The data entries 64a to 64g are the nodes of the map 70a. The data entry 64c is a root node, the data entries 64a, 64d, and 64e are branch nodes, and the data entries 64b, 64f, and 64g are leaf nodes.

Figure 12:
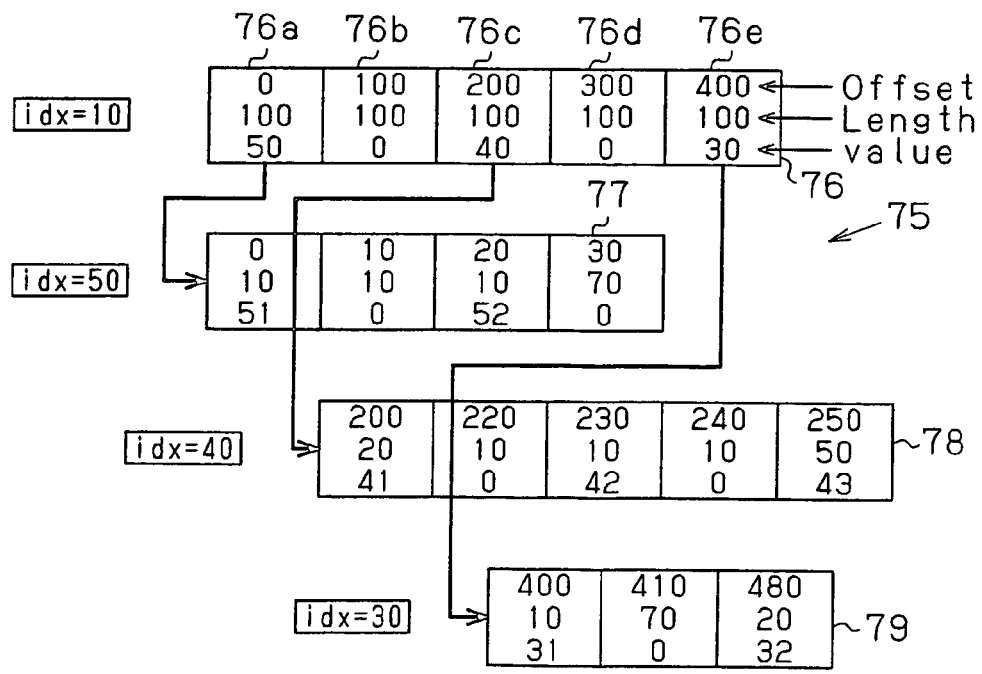
FIG. 12 is a diagram showing the binding of a node with the extent.

The binding of nodes with extents will now be discussed with reference to FIG. 12.

The map 75 includes a plurality of data entries (nodes) 76 to 79. The entry 76 has index 10, the data entry 77 has index 50, the data entry 78 has index 40, and the data entry 79 has index 30.

The node 76 includes a plurality of extents 76a to 76e. The index (50) of the data entry 77 is held as the value of the extent 76a. The index (40) of the data entry 78 is held as the value of the extent 76c. The index (30) of the data entry 79 is held as the value of the extent 76e. Accordingly, the data entry 76 is bound with the data entries 77 to 79 by the extents 76a, 76c, and 76e.

Zero is held as the values of the extents 76b and 76d. Such extents are null extents that are not bound with lower rank nodes.

Each table will now be described.

Cache Extent Table (CET)

The CET is a table for managing extents on a cache (cache extent, C-ext). The cache is a continuous area in a hypothetical memory space and used as the unit of the cache extent. The cache extent is an area represented by the offset and length of a cache. In comparison, the page cache of the prior art is used in units of pages, which is a cache extent having a constant length.

Each data entry holds data (offset, length, head [ ]).

TABLE 1

| Name | Type | Description |
|---|---|---|
| offset | address | address of cache extent |
| length | byte number | length of cache extent |
| head[ ] | identification array | identification of cache header holding map information for cache subject of cache extent, index of array differs depending on type of cache subject |

| index | cache subject |
|---|---|
| 0 | storage |
| 1 | object |
| 2 | file |

The identification of each data entry is referred to as cache extent identification.

Data "head [ ]" (identification array) is an array for holding a storage, an object, and a file bound with a cache extent. Head [0] holds a storage, head [1] holds an object, and head [2] holds a value for specifying a file. A value of "0" indicates that there is no binding.

Storage Extent Table (SET)

The SET is a table for managing an extent in a storage (storage extent, S-ext). A storage is a volume such as a disk partition (logically divided disk device or memory section) or a logical volume and is used as the unit of storage extents. The storage extent is a section represented by an offset and length in the storage. In comparison, in the file system of the prior art, the storage is used in units of disk blocks, which are storage extents having the same lengths.

Each data entry holds the following data.

TABLE 2

| Name | Type | Description |
|---|---|---|
| offset | address | storage offset of storage extent |
| length | byte number | length of storage extent |
| Sid | identification | identification of storage to which storage extent belongs |

Cache Header Table (CHT)

The CHT is a table for managing the correspondence of the cache subject and the cache extent (C-ext). The cache subject is one of a storage, an object, and a file. The map information of the cache subject and the cache extents are managed by a cache extent map (CEM) having a B-tree configuration. That is, the CHT is a table that holds the map information of the cache subject and the cache extents and manages nodes configuring a cache extent map (CEM nodes). The cache header table holds the CEM nodes in a bit map array. The bit map array indicates CEM nodes that are being used and blank CEMs.

Object Table (OT)

The OT is a table for managing a storage extent (S-ext). A group of storage extents configures an object. All of the storage extents configuring an object exist in the file server 24. Accordingly, the object table is a table that manages the map information of the object and the storage extents. The map information of the object and the storage extents is managed by a storage extent map (SEM) having a B-tree configuration.

The object table is a table that manages nodes configuring a storage extent map. The object map holds the SEM nodes in an array and manages the SEM nodes that are being used and the blank SEM nodes.

File Table (FT)

The FT is a table for managing the map information of a file and an object. The object configures a file. The file is configured by an object of a single file server or an object of a plurality of file servers. The map information of a file and an object is managed by a storage extent map (SEM) having a B-tree configuration.

The file table is a table that manages nodes (hereafter referred to as OM nodes) configuring an object map. The file table holds the OM nodes in an array and manages the OM nodes that are being used and the blank OM nodes.

Each map will now be discussed.

Storage Extent Map (SEM)

The SEM manages the map information of an object and a storage extent (S-ext) with a B-tree configuration. In the map, the data entry of the object table (OT) is used for nodes. The nodes configuring a B-tree hold the following data.

TABLE 3

| Name | Type | Description |
| --- | --- | --- |
| offset | address | head address of object in storage extent |
| length | byte number | length of storage extent |
| flag | flag value | indicates the type of node and has the following values<br>ROOT    root node<br>BRANCH branch node<br>LEAF    leaf node |
| branch | identification | identification of upper rank node, for a root node, cache header identification |
| seem[ ] | configuration array | map array, each element (entry) holds following data<br><br>\| Name \| Type \| Description \|<br>\| offset \| address \| head address of object in map section \|<br>\| length \| byte number \| length of map section \|<br>\| value \| identification \| identification of lower rank node, storage extent identification for leaf nodes \| |

The identification of the upper rank node held as data "branch" (identification) by the SEM node is an idx of the upper range SEM node connected to the SEM node. Accordingly, when the SEM node is a root node, the cache header identification is held as data "branch". The data "seem [ ]" (configuration array) is an extent array, and the data entries of the OT include a plurality of extents.

Free Storage Extent Map (FSEM)

The FSEM manages blank extents in a disk (storage extents that are not being used are referred to as free storage extents). In the map, data entries of an object table (OT) are used for nodes. The free storage extent is managed by mapping objects referred to as FSEM objects. The map information of the FSEM object and the free storage extent is managed by a B-tree configuration in the same manner as a normal object. That is, an SEM of which managing subject is the FSEM object is referred to as a free storage extent map (FSEM).

Object Map (OM)

The OM manages the map information of a file and an object with a B-tree configuration. In the map, the data entry of the file table (FT) is used for nodes. The MBC manager 42 has two banks for different purposes. Each file has a B-tree. The nodes (OM nodes) configuring the B-tree hold the following data.

TABLE 4

| Name | Type | Description |
| --- | --- | --- |
| offset | address | head address of file in map section managed by the node |
| length | byte number | length of map section managed by the node |
| flag | flag value | indicates the type of the node and has the following values<br>ROOT    root node<br>    identification of root node referred to as a file identification<br>BRANCH branch node<br>LEAF    leaf node |
| branch | identification | identification of upper rank node, for a root node, cache header identification |
| om[] | configuration array | map array, each element (entry) holds following data<br><br>\| Name \| Type \| Description \|<br>\| offset \| address \| head address of object in map section \|<br>\| length \| byte number \| length of map section \|<br>\| value \| identification \| identification of lower rank node, storage extent identification for leaf nodes \| |

The identification of the upper rank node held as data "branch" (identification) by the OM node is an idx of the upper range OM node connected to the OM node. Accordingly, when the OM node is a root node, the cache header identification is held as data "branch". The data "om [ ]" (configuration array) is an extent array, and the data entries of the FT include a plurality of extents.

Cache Extent Map (CEM)

The CEM manages the map information of a cache subject (storage (S-ext), an object, and a file) and a cache extent (C-ext) with a B-tree configuration. In the map, the data entry of a cache header table (CHT) is used for nodes. The nodes configuring a B-tree hold the following data.

TABLE 5

| Name | Type | Description |
| --- | --- | --- |
| offset | address | head address of cache subject in map section managed by the node |
| length | byte number | length of map section managed by the node |
| flag | flag value | indicates the type of node and has the following values<br>ROOT    root node<br>    identification of root node referred to as a cache header |

TABLE 5-continued

| Name | Type | Description | | |
|------|------|-------------|---|---|
| branch | identification | identification<br>BRANCH branch node<br>LEAF leaf node<br>identification of upper rank node, for a root node, cache subject identification | | |
| cem[ ] | configuration array | map array, each element (entry) holds following data | | |
| | | Name | Type | Description |
| | | offset | address | head address of cache subject in map section |
| | | length | byte number | length of map section |
| | | value | identification | identification of lower rank node, cache extent identification for leaf nodes |

The identification of the upper rank node held as data "branch" (identification) by the CEM node is an idx of the upper range CEM node connected to the CEM node. Accordingly, when the CEM node is a root node, the cache subject identification is held as data "branch". The data "cem [ ]" (configuration array) is an extent array, and the data entries of the CHT include a plurality of extents.

Free Cache Extent Memory (FCEM)

The FCEM manages blank extents in the cache memory 44 (cache extents that are not being used are referred to as a free cache extent). The data entries of the cache header table (CHT) is used for a node. The free cache extent is managed by mapping objects referred to as FCEM objects. The map information of the FCEM object and the free cache extent is managed by a B-tree configuration in the same manner as a normal cache subject. That is, the CEM of which managing subject is the FCEM object is referred to as a free cache extent map (FCEM).

Figure 16:
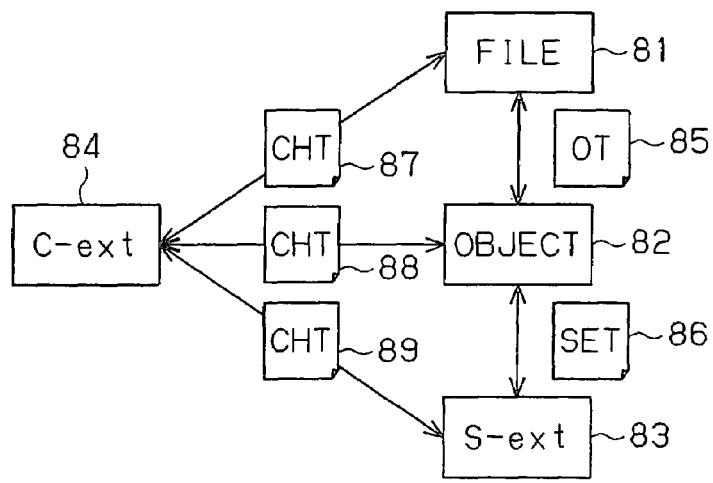
FIG. 16 is a schematic diagram showing the relationship of various tables.

Referring to FIG. 16, an object table (OT) 85 binds a file 81 and an object 82. A storage extent table (SET) 86 binds the object 82 and a disk block (storage extent S-ext) 83. Cache header tables (CHTs) 87, 88, and 89 respectively bind a cache extent (C-ext) 84 with the file 81, the object 82, and the disk block (storage extent S-ext) 83. Accordingly, searching between the file 81, the object 82, the S-ext 83, and the C-ext 84 may be searched by referring to the tables 85 to 89.

The above description may be summarized as follows.

The CHT, OT, and FT are tables for "mapping Y in X" in which "X" holds a root node and "Y" holds a leaf node.

Figure 17:
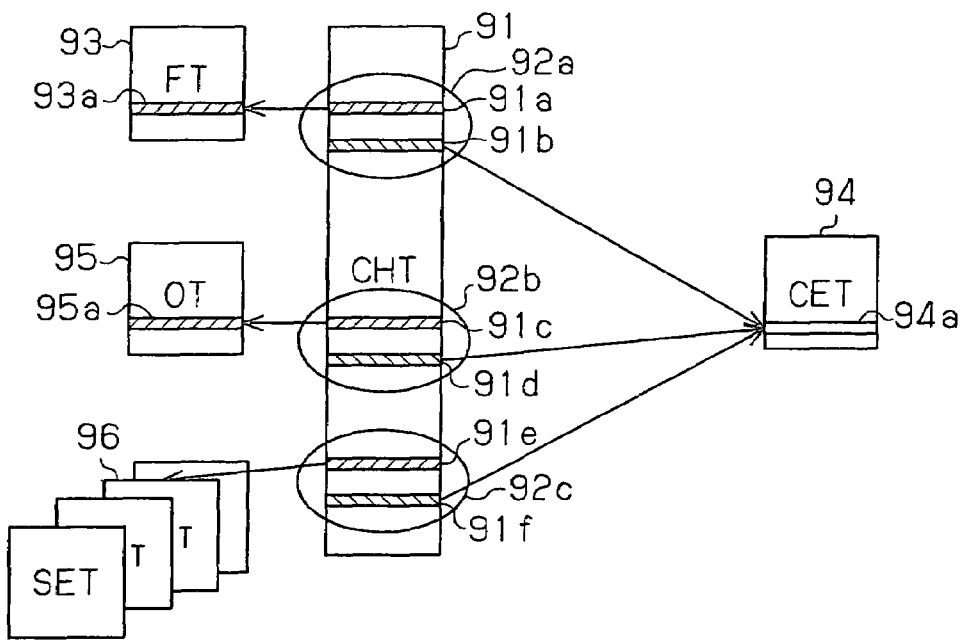
FIG. 17 is a schematic diagram showing binding with a CHT.

The binding with the CHT will now be described with reference to FIG. 17.

The CHT 91 includes data entries 91a to 91f. The data entries 91a and 91b are nodes configuring a CEM 92a. The CEM 92a maps a data entry 94a of a CET 94 with a data entry 93a of an FT 93. That is, the data entry 93a, which is a root node, holds information representing the data entry 93a of the FT as cache subject identification. The data entry 91b, which is a leaf node, holds information representing the data entry 94a of the CET 94 as cache extent identification.

In the same manner, the data entries 91c and 91d are nodes configuring a CEM 92b. The CEM 92b maps a data entry 94a of a CET 94 with a data entry 95a of an OT 95. That is, the data entry 91c, which is a root node, holds information representing the data extent 95a of the OT as cache subject identification. The data entry 91d, which is a leaf node, holds information representing the data entry 94a of the CET 94 as cache extent identification.

In the same manner, the data entries 91e and 91f are nodes configuring a CEM 92c. The CEM 92c maps a data entry 94a of a CET 94 with a SET 96. That is, the data entry 91e, which is a root node, holds information representing the SET 96 as cache subject identification. The data entry 91f, which is a leaf node, holds information representing the data entry 94a of the CET 94 as cache extent identification. The SET 96 is generated for each volume, and the CEM 92c for mapping the volumes is also generated for each volume.

Accordingly, the data entry 94a of the CET 94 is mapped by the data entry 93a of the FT 93, the date entry 95a of the OT 95, and the SET 96.

Figure 18:
FIG. 18 is a schematic diagram showing binding with an OT.

The binding with the OT will now be discussed with reference to FIG. 18.

The OT 95 includes the data entries 95a and 95b. The data entries 95a and 95b are nodes configuring an SEM 97. The data entry 95a, which is a root node, holds an object identification. The data entry 95b, which is a leaf node, holds information representing the data entry 96a of the SET 96 as storage extent identification.

Figure 19:
FIG. 19 is a schematic diagram showing binding with an FT.

The binding with the FT will now be discussed with reference to FIG. 19.

The FT 93 includes the data entries 93a and 93b. The data entries 93a and 93b are nodes configuring an OM 98. The data entry 93a, which is a root node, holds a file identification. The data entry 93b, which is a leaf node, holds information representing the data entry 95a of the OT 95 as storage extent identification.

Figure 20:
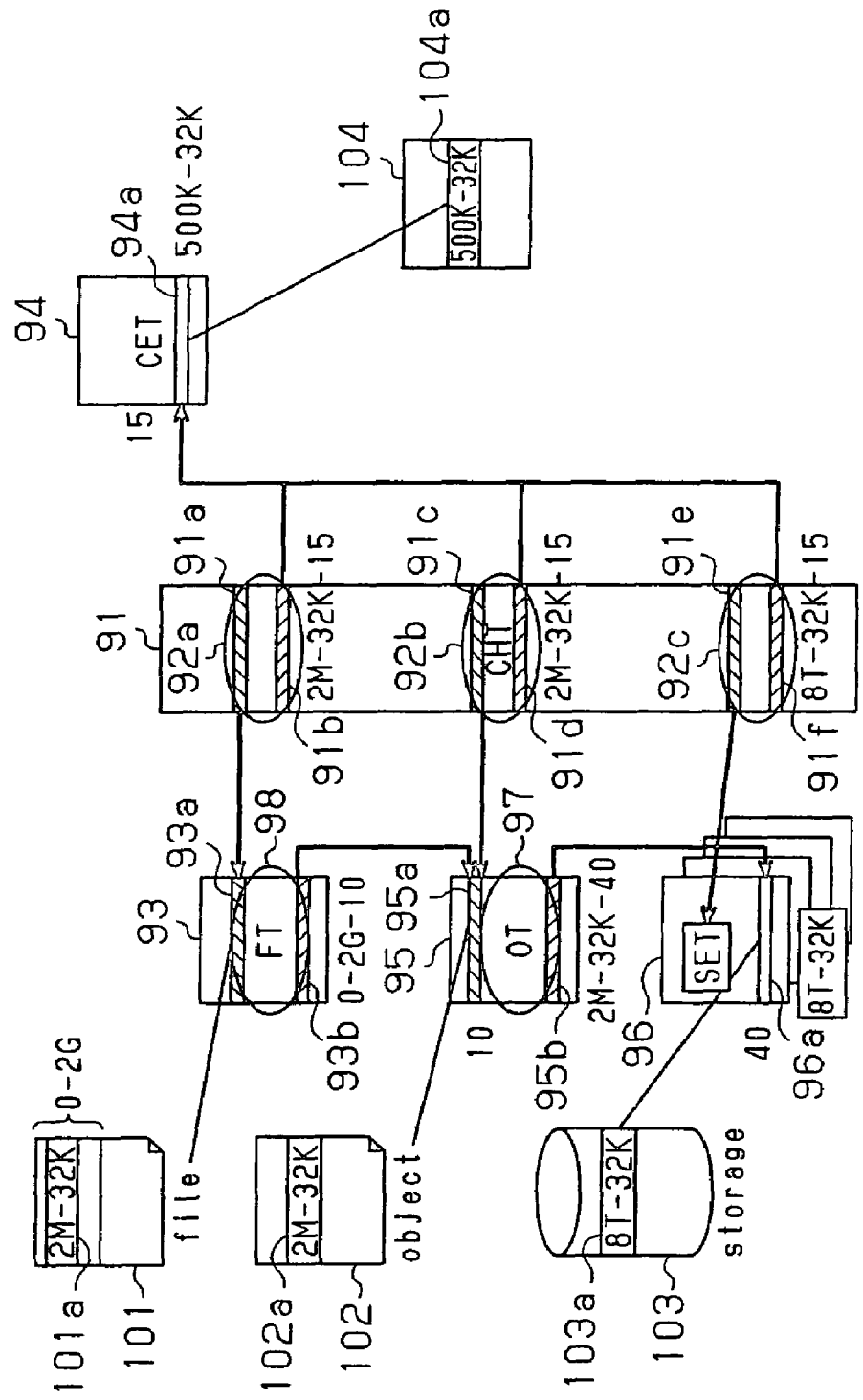
FIG. 20 is a schematic diagram showing binding with the various tables.

The binding with various tables will now be discussed with reference to FIG. 20.

An extent 101a of a file 101, an extent 102a of an object 102, and a storage extent 103a of a storage 103 are the same. The offset and the length are described in each of the extents 101a, 102a, and 103a.

The data entry 94a of the CET 94 holds a set representing a cache extent 104a of a cache memory 104. The cache extent 104a is mapped via the CET 94 and the CHT 91 by the FT 93, the OT 95, and the SET 96 to the extent 101a of the file 101, the extent 102a of the object 102, and the storage extent 103a of the storage 103.

The objects handled by the MBC manager 42 will now be discussed.

An object configuring a file is referred to as a normal object. The contents of a normal object is data related to a file. Objects used for various tables or transfer buffers are referred to as reservation objects. An object added to each disk, object, and file are referred to as a reservation number. The reservation number is used to include additional information of a disk device or a file (i.e., owner of the file or capacity of the disk device). The contents of the reservation is meta data.

A well known object ID is included in the reservation object. The value of the object ID is not determined until the object is actually allocated. Thus, for the sake of convenience, the well known object is used to access an object, such as an OT or an FT. The well known object ID is converted to an actual object ID by searching a bank of the OM.

The identifications (IDs) handled by the MBC manager 42 will now be discussed.

An ID for identifying a disk in a sub network is referred to as a storage ID, an ID for identifying an object is referred to as an object ID, and an ID for identifying a file in a sub network is referred to as a file ID. An ID for identifying a cache subject (disk block, object, and file) is referred to as a cache ID.

The object ID is divided into multiple classes.

A CLASS_A object ID and CLASS_C object ID is a well known ID (an ID in which data acquired for an ID number is already known) for identifying a reservation object in a node (intra-node reservation ID). A CLASS_B object ID is a well known ID for identifying a reservation object in a cluster (intra-cluster reservation ID). A CLASS_D object ID is an ID for identifying an object in a sub network (sub network ID).

The ID of a normal object (simply referred to as ID) is determined when an object is generated. In comparison, the ID of an object, such as the CHT, CET, SET, OT, or FT, is reserved as a well known ID. For example, when a table is in another file server, only an ID would require communication for inquiring as to the ID of an object. However, the designation of an ID would be enabled without inquiring as to the ID of an object reserved as a well known ID. This facilitates the reference and change of the intended table (CHT, etc.).

The generic term for the objects from CLASS_A to CLASS_C is well known object ID. The object ID of CLASS_D is the actual object ID, and the objects of CLASS_A to CLASS_D are converted to the object ID of CLASS_D by searching the OM bank 1. In addition to when a cluster is generated in a single node (computer), the multi-bind cache manager enables the sharing of a cache subject when a cluster is generated in a plurality of nodes (file servers) of a sub network.

A class is provided for a well known object ID used in this case. As long as CLASS_A and CLASS_C are unique in nodes, these IDs may be overlapped in the nodes. CLASS_A differs from CLASS_C in that CLASS_A reserves a single value while CLASS_C reserves 255 continuous values. CLASS_B is an ID that is unique in a cluster.

Binding will now be discussed. The subject of binding is as described below.

When the binding subject is the storage extent (S-ext) and an object, the storage extent is inserted in the node of the SEM of the object (data entry) to perform binding.

The insertion of each extent will now be discussed with reference to FIGS. 14A and 14B.

Figure 14A:
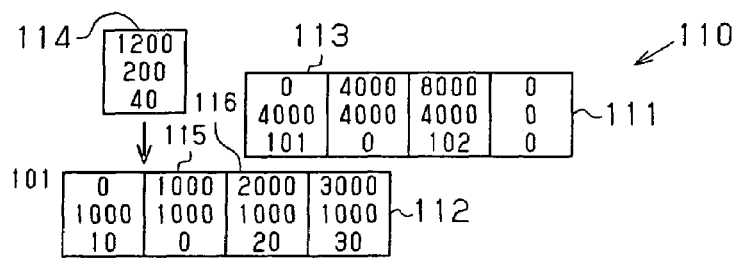
FIG. 14 is a schematic diagram showing the insertion of the extent.

FIG. 14A shows a map 110 including two nodes 111 and 112. The nodes 111 and 112 each have four extents. The node 112 is a leaf node and provided with index "101". The upper rank node 111 has an extent 113 holding a set including index "101", which represents the node 112.

Figure 14B:
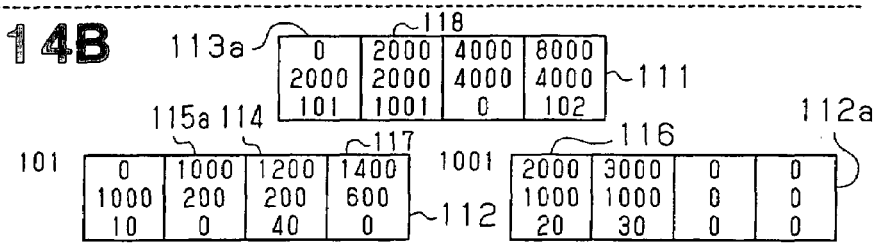

In the map 110 of FIG. 14A, when inserting the extent 114, which holds the offset "1200" and the length "200" in the leaf node 112, as shown in FIG. 14B, the extent 114 is inserted between an extent 115 and an extent 116 of the leaf node 112.

Further, a null extent 117 holding offset "1400" and length "600" is inserted so as not to affect the subsequent extent 116. The extent 115 is changed to an extent 115a having length "200" corresponding to the offset of the extent 114. Further, since the number of extents becomes greater than the regulated value (four), the leaf node 112 is divided into two leaf nodes 112 and 112a. One leaf node 112 is provided with the original index "101" while the other leaf node 112a is provided with a new index "1001". The upper rank node 111 has an extent 113a of which content is changed to represent one leaf node 112. An extent 118 representing the other leaf node 112b is inserted in the upper rank node 111.

The deletion of each extent will now be discussed with reference to FIGS. 15A to 15C.

Figure 15A:
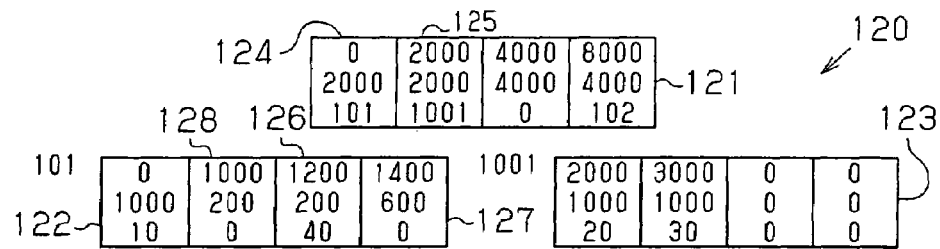
FIG. 15 is a schematic diagram showing the deletion of the extent.
Figure 15B:
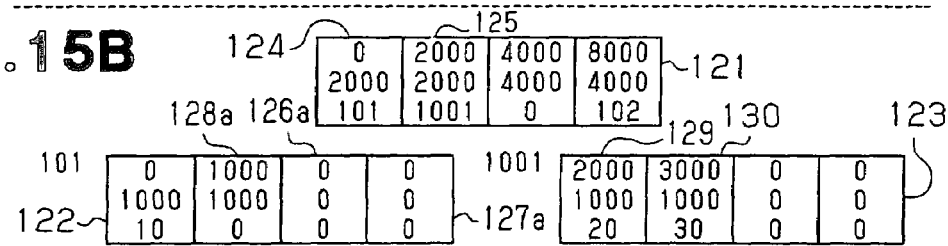
Figure 15C:
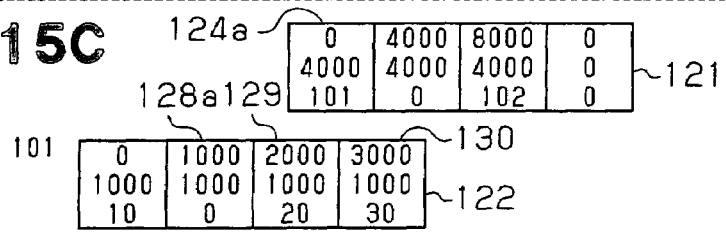

Referring to FIG. 15A, a map 120 includes three nodes 121, 122, and 123. The nodes 121 to 123 each have four extents. The nodes 122 and 123 are leaf nodes and are respectively provided with indexes "101" and "1001". The extents 124 and 125 of the upper rank node 121 hold a set representing the nodes 122 and 123.

An extent 126 included in the node 122 is deleted from the map 120. In this state, the deleted extent 126 holds offset "1200" and length "200". The next extent 127 is a null extent. Accordingly, the extents 126 and 127 are changed to blank extents 126a and 127a, as shown in FIG. 15B. Further, the extent 128 is changed to an extent 128a having length "1000" to include the lengths of the extents 126 and 127.

The two leaf nodes 122 and 123 each have two used extents. The number of the used extents is within the regulated value and may be included in a single node. Accordingly, a B-tree compression process is performed. That is, referring to FIG. 15C, the leaf node 22 holds the extents 129 and 130 used by the other leaf node 123. The upper rank node 121 deletes the extent 125 (FIG. 15B) so that the other leaf node 123 is not shown and changes the extent 124 held by the upper rank node 121 to an extent 124a having length "4000" to show the single leaf node 122.

When the binding subject is an object and a file, an object is inserted in the OM (bank 0) of the file.

When the binding subject is a cache extent (C-ext) and a cache subject, a cache extent is inserted in the CEM node (data entry) of the cache subject.

An OM for mapping a file and an object is in an FT. There are two OMs for each file. One is referred to as bank 0, and the other is referred to as bank 1. The contents of bank 1 and bank 0 are substantially the same. Bank 0 holds the location of an object in the file, and bank 1 holds information added to the file (i.e., owner of file and executed program) Accordingly, bank 0 is searched when conducting an object search and bank 1 is searched when a well known object ID is converted to a CLASS_D object.

When the binding subject is a blank storage extent (S-ext), a blank storage extent is inserted in an FSEM node (data entry). When the binding subject is a blank cache extent (C-ext), a blank cache extent is inserted in an FCEM node (data entry)

When the binding subject is a well known object ID and the well known object ID is bound with an object ID that is not well known, the well known ID is inserted in the OM (bank 1) of a root directory. When the binding subject is a reservation number and an adding subject (file), a reservation number is inserted in the OM (bank 1) of the adding subject.

A search (query) will now be discussed.

A search is performed based on the binding to search a map, which corresponds to the search subject that is to be acquired, to acquire the subject. In other words, a search is a process that designates the offset and length of a search subject to acquire an extent. The query process is performed, for example, when reading or writing a file, when changing a reference of a table (object), or when periodically writing on a disk a cache, which has not been written to a disk.

For example, when acquiring a storage extent from an object, the SEM of the object is searched to find the storage extent. In the same manner, when acquiring an object from a file, the OM (bank 0) of the file is searched. When acquiring a cache extent from the cache subject, the CEM of the cache subject is searched.

When generating or expanding a file, the FSEM is searched when acquiring a blank storage extent and the FCEM is searched when acquiring a blank cache extent. Further, when acquiring a well known object ID, the OM (bank 1) of a root directory is searched when acquiring a well known object ID, and the OM (bank 1) of an adding subject is searched when acquiring a reservation number from the adding subject.

The search of an extent is performed as described below.

Figure 13:
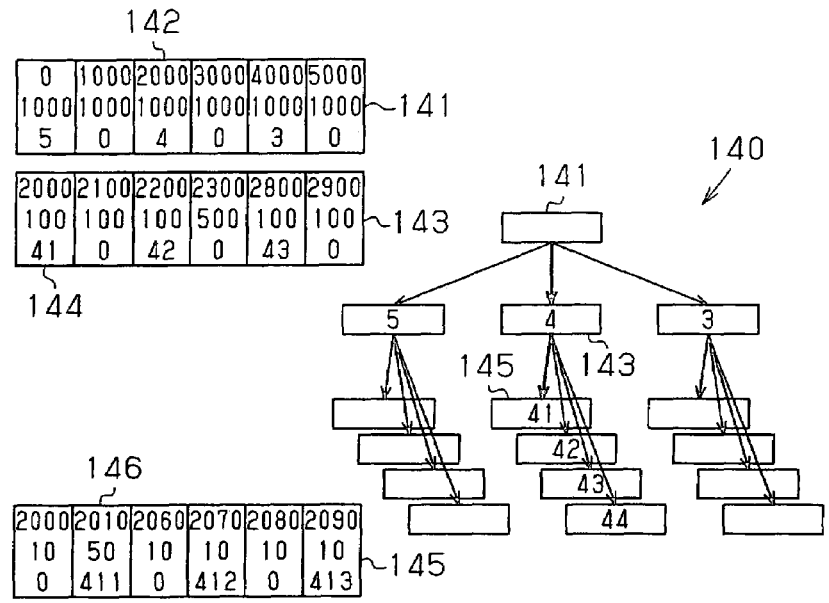
FIG. 13 is a schematic diagram showing a search for the extent.

For example, the extent of which offset is "2048" is searched from the map 140 of FIG. 13. The value shown in the node of the B-tree in FIG. 13 is the index of that node.

An extent array of the root node 141 of the map 140 is searched with an offset to detect the extent including the desired offset "2048", or an extent 142 holding offset "2000" and length "1000".

Then, based on the value held by the extent 142, the extent array of node 143 represented by index "4", which is an identification of a lower rank node held as the value, is searched. The extent including the desired offset "2048", or an extent 144 holding offset "2000" and length "100" is detected.

Then, based on the value held by the extent 144, the extent array of node 145 represented by index "41", which is an identification of a lower rank node held as the value, is searched. The extent including the desired offset "2048", or an extent 146 holding offset "2010", length "50", and value (index) "411" is detected. The value held by the extent 146 obtains index "411", which is material.

The file input/output of a file server 24 with respect to the client machine 21 of FIG. 5 will now be discussed.

The file server 24 searches a cache extent with a file ID and an offset. When a cache extent exists, the file server 24 transmits the data of the cache extent to the client machine 21.

When a cache extent does not exist, the file server 24 binds the file and the cache extent. Then, the file server 24 locks the bound cache extent so that other devices do not use it. Subsequently, the file server 24 inputs and outputs data with respect to the cache extent (write data read from the disk device 35 of FIG. 4 to the cache extent or store data of the cache extent to the disk device.35). When the file server 24 ends the input and output of data, the file server 24 unlocks the cache extent.

The binding of the cache extent will now be described in detail.

The file server 24 searches for an object from an OM with a file ID and an offset. When the object is not found, the file server 24 acquires a new object ID and binds an object to a file.

Then, the file server 24 searches for a storage extent from an SEM with an object ID and an offset. When the storage extent is not found, a blank storage extent is acquired from an FSEM, and a storage extent is bound with an object.

Subsequently, the file server 24 acquires a blank cache extent from an FCEM and binds the blank cache extent with and in the order of a disk, an object, and a file.

In this manner, the file server 24 performs binding in the order of object and storage. When conducting a search, the file server 24 conducts the search in the order of storage and object.

The writing (committing) of a cache extent will now be discussed.

Committing, which refers to the storage of the contents of a cache extent in the disk device 35, prevents the contents of a file stored in the cache memory 44 from being lost due to a power cut. The committing is performed when a commit daemon program is executed. The operation of the CPU 31 (FIG. 6) resulting from the commit daemon program will now be discussed.

The file server 24 activates the commit daemon program at constant time intervals. The activated commit daemon program searches a CEM for a cache extent bound by a disk device (FIG. 6) in the offset order of the disk device 35. The commit daemon program selects a predetermined number of non-written cache extents and writes the contents to the disk device 35.

The reuse (release and purge) of a cache extent will now be discussed.

The cache memory 44 is a finite resource and becomes insufficient when binding continues. Thus, the binding of cache extents that are seldom used (the elapsed time from when the cache extent was last used or the number of usages being small) is released and reused. The process for doing so is referred to as a purge process in which a cache extent is separated from a cache subject to generate a blank cache extent. Such blank cache extent is a reusable cache extent.

When the contents of a cache are not written to a disk, a "commit process" is performed to write the contents to a disk. The cache extent holds information of a storage extent for writing its own self. This enables quick writing to a disk. However, writing does not have to be performed unless the state of a cache extent is valid and dirty (not written).

An "unbind process" is then performed to unbind the cache extent and the cache subject. The bind process is reversed and the CHT is searched to delete the corresponding extent. Finally, the cache extent is released. The cache extent is released by binding the FCET object.

The purge process is performed by executing a purge daemon program. The operation of the CPU 31 during execution of the purge daemon program will now be discussed.

The file server 24 activates the purge daemon program at constant time intervals. The activated purge daemon program monitors the length of a purge queue. When the length exceeds a reference value, the binding of the number of cache extents corresponding to the exceeding amount is released from the head of the queue to generate blank cache extents.

The procedures for such a process will now be described with reference to FIGS. 21 to 31.

A query process will be discussed with reference to FIGS. 21 and 22.

Figure 21:
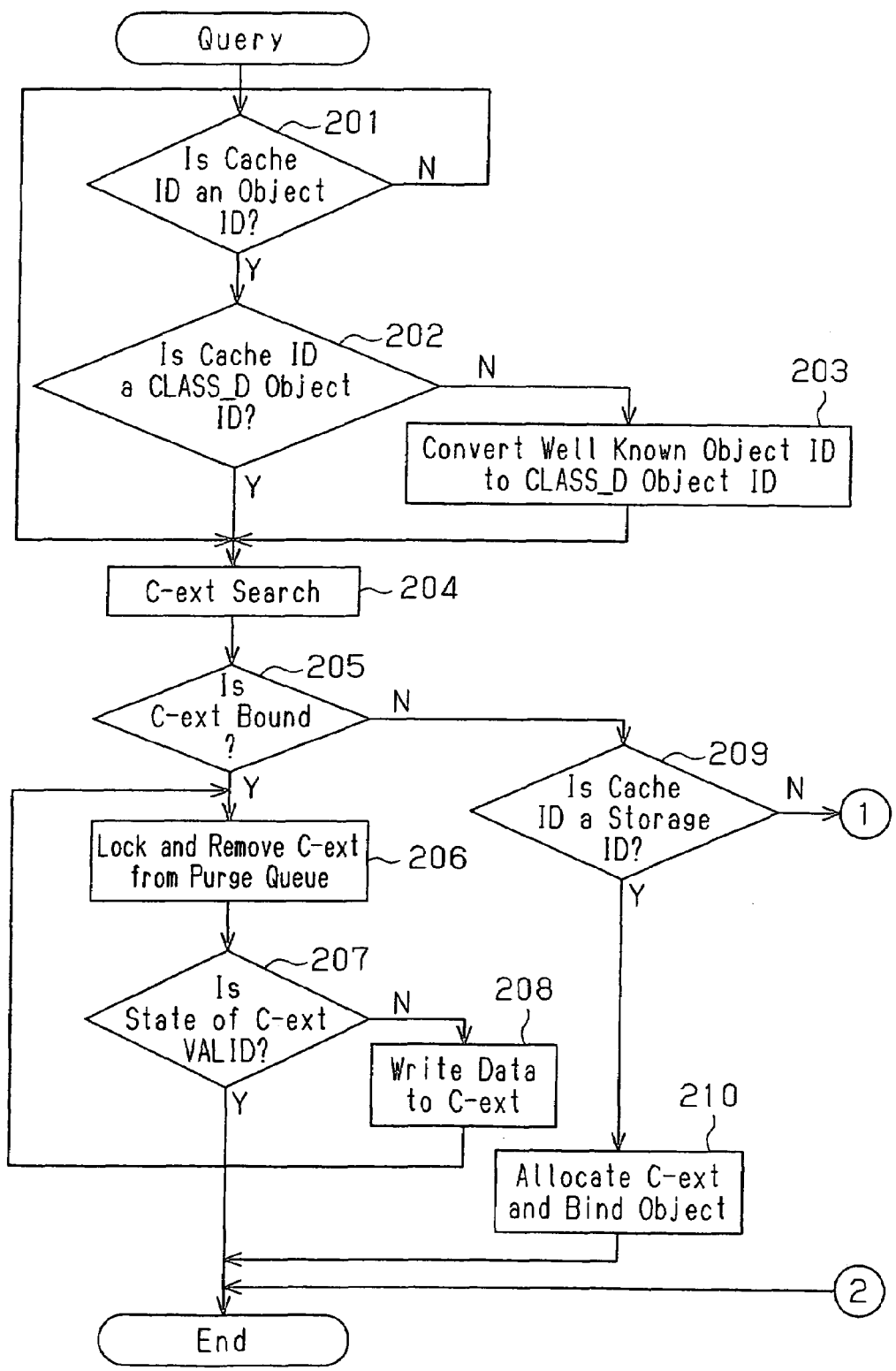
FIGS. 21 and 22 are flowcharts of a query process.
Figure 22:
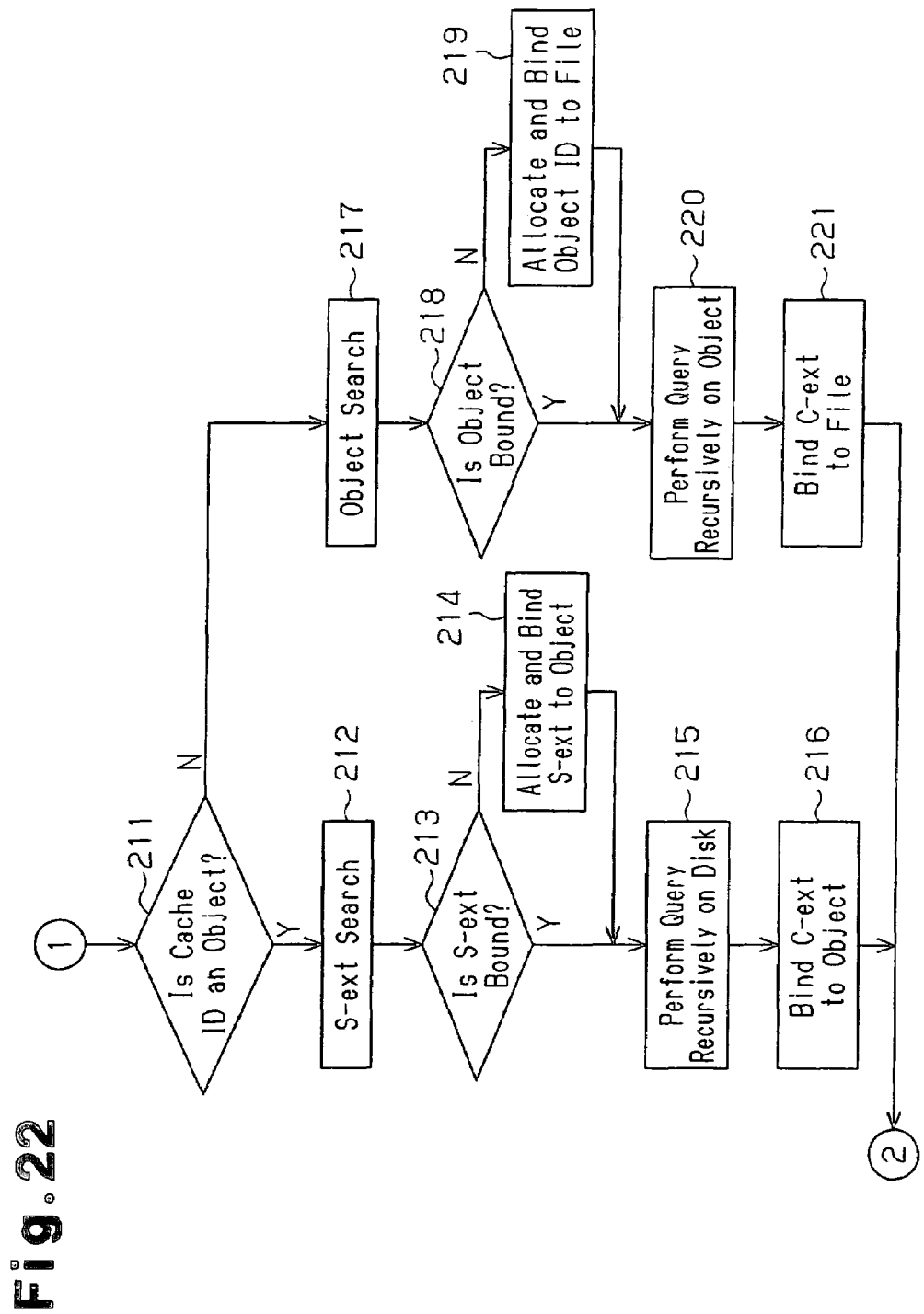

FIGS. 21 and 22 show the procedure for searching a cache extent (C-ext) from a cache subject. Other searches are conducted through the same procedures.

The file server 24 first determines whether the cache ID is an object ID (S201). When the cache ID is an object ID, the file server 24 determines whether the cache ID is the CLASS_D object ID (S202). When the cache ID is the CLASS_D object ID, the file server 24 proceeds to step S204. When the cache ID is not the CLASS_D object ID, the file server 24 converts a well known object ID to the CLASS_D object (S203). In step S201, when the cache ID is not an object ID, the file server 24 proceeds to step S204.

The file server 24 searches a cache extent (S204) and determines whether the cache extent has been bound (S205). When the cache extent is bound, the file server 24 locks and removes the cache extent from a purge queue (S206). The file server 24 then determines whether the state of the cache extent is valid or not (S207). A state in which the cache extent is filled with the contents of a cache subject (file, object, storage) or a state in which the rewriting of a cache subject with the contents of the present cache extent indicates that the cache extent is valid. The file server 24 ends processing when the cache extent is valid. When the cache extent is not valid, the file server 24 reads data to the cache extent (S208) and then ends the process.

When it is determined that the cache extent has not been bound in step S205, the file server 24 determines whether the cache ID is a storage ID (S209). When the cache ID is a storage ID, the file server 24 allocates a cache extent and binds a storage (S210).

When the cache ID is not a storage ID in step S209, the file server 24 determines whether the cache ID is an object (FIG. 22, S211). When the cache ID is an object, the file server 24 searches the storage extent (S212) and determines whether the storage extent has been bound (S213). When the storage extent has not been bound, the file server 24 allocates a storage extent and binds an object (S214).

When the storage extent has been bound or when the object has been bound, the disk device 35 recursively performs a courier (S215), binds the cache extent to the object (S216), and ends processing.

When the cache ID is not an object in step S211, the file server 24 searches for an object (S217) and determines whether the object is bound (S218). When the object is not bound, the file server 24 allocates an object ID and binds the file (S219).

When the object is bound or after the file is bound, the file server 24 recursively performs a query on the object (S220), binds the cache extent (S221), and ends the process.

The extent search process and the extent allocation process will now be discussed.

The "extent search process" is a search process for the CHT, the OT, and the FT and searches the CHT when searching for a cache extent in the query process (steps S204 of FIG. 21). When there is no cache, the file server 24 performs the "extent allocation process" for allocating a new cache extent. At this time, the CHT is also searched. A cache extent that is not being used is bound by an FCET object.

The contents of a file are then written to a cache extent to validate the cache extent. The FT is searched at this time to locate the corresponding object, and the file writing is translated to object writing. Further, the file server 24 searches the OM, locates the corresponding storage extent, and translates the object writing to storage writing. Finally, the data of the storage is actually written to the cache extent.

During the translation of the file writing to the storage writing, a storage may not be allocated and a new storage extent is allocated. The OT is also searched at such time. A storage extent that is not being used is also bound with the FSET object.

The "bind process" is performed on the allocated cache extent or storage extent. The CHT is searched in the bind process of the cache extent and an extent is inserted in the corresponding location. The bind process of the storage extent searches the OT and an extent is inserted in the corresponding location.

Figure 23:
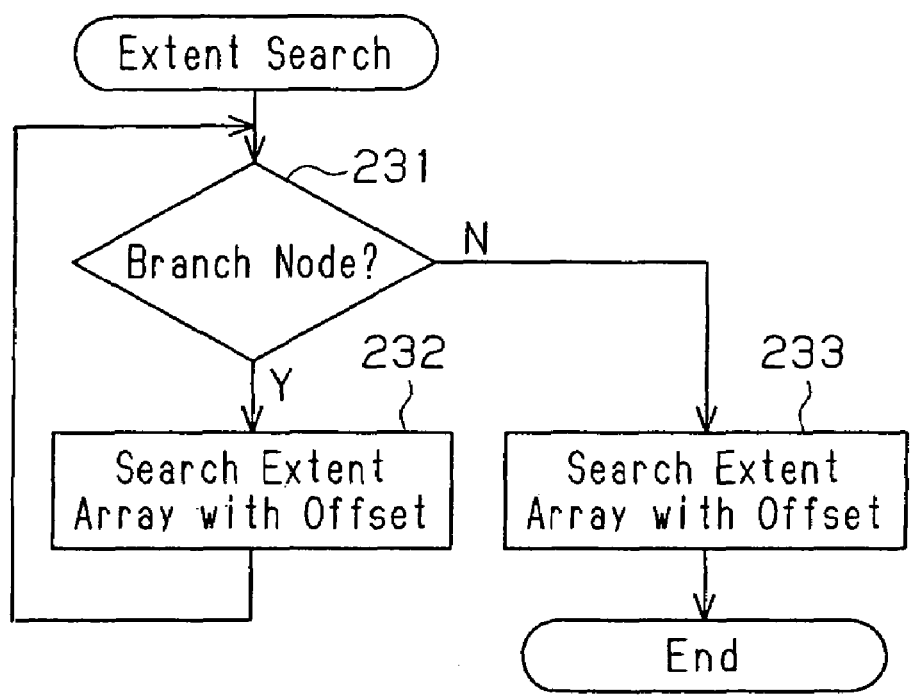
FIG. 23 is a flowchart of an extent search process.
Figure 24:
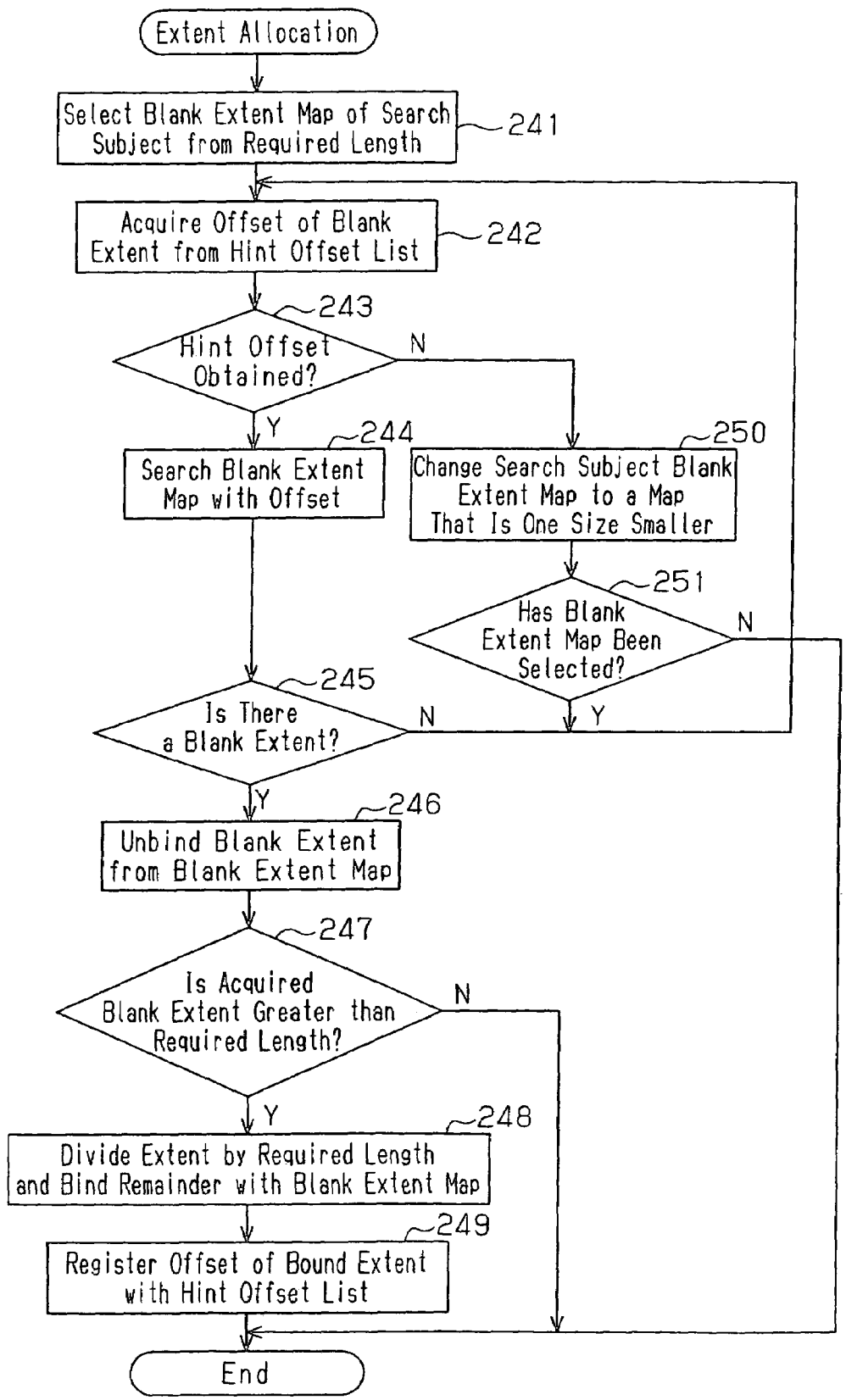
FIG. 24 is a flowchart of an extent allocation process.

The extent search process and the extent allocation process will now be discussed with reference to flowcharts. FIG. 24 is a flowchart showing the extent allocation process. These processes are activated by the query process of FIGS. 21 and 19. That is, steps S231 to S233 of FIG. 23 are sub-steps of steps S204 and S212 of FIGS. 21 and 19, and steps S241 to S251 of FIG. 24 are sub-steps of FIGS. 21 and 19.

The extent search process will first be discussed with reference to FIG. 23.

The file server 24 determines whether or not a node is a branch node (S231). If the node is a branch node, the file server 24 searches for an extent array with an offset (S232) and proceeds to step S231.

When the node is not a branch node, the file server 24 searches for an extent array with an offset (S233) and ends the process. That is, the extent array of a leaf node is searched with an offset.

The extent allocation process will now be discussed with reference to FIG. 24.

The file server 24 selects a blank extent map (FSEM or FCEM) of the search subject from the requested length (S241) and acquires the offset of the blank extent from a hint offset list.

The hint offset list increases the speed for searching a free cache extent or a free storage extent. The offsets of the cache extent or storage extent (cache address or storage offset) returned to the FCEM or the FSEM in the past are accumulated. The accumulated information is referred to in order to eliminate the next search.

Then, the file server 24 determines whether or not a hint offset has been obtained (S243) and searches the extent map (FSEM or FCEM) with an offset when a hint offset has been obtained (S244).

The file server 24 then determines whether or not there is a blank extent (S245). When there is a blank extent, a blank extent is unbound from the blank extent map (S246).

The file server 24 then determines whether the acquired blank extent is larger than the required length of the extent (S247). When the acquired blank extent is larger than the required length, the file server 24 divides the extent with the required length and binds the extent map with the remainder (S248). The required length corresponds to the amount of data stored in an extent.

The file server 24 registers the offset of the extent bound to the hint offset list (S249). When the acquired blank length is not larger than the required length in step S247, the file server 24 ends the extent allocation process.

When a hint offset is not obtained in step S243, the file server 24 changes the search subject blank extent map to a map that is one class smaller (S250). The file server 24 then determines whether or not the blank extent has been selected (S251) and when the blank extent has been selected, proceeds to step S242. When the blank extent has not been selected, the file server 24 ends the process.

Figure 25:
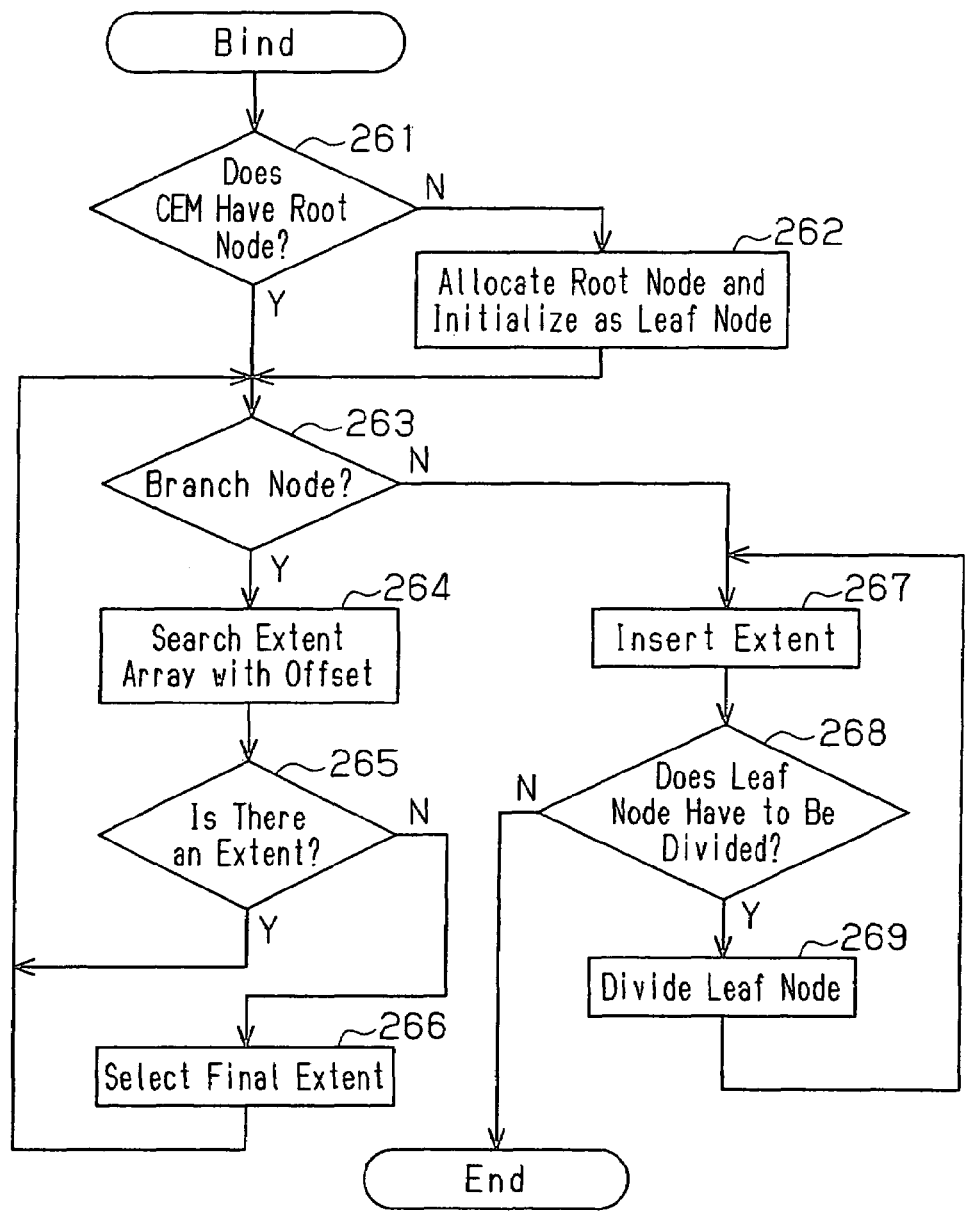
FIG. 25 is a flowchart of a bind process.

The bind process will now be discussed with reference to FIG. 25.

The file server 24 first determines whether or not the CEM includes a root node (S261). When there is no root node, the file server 24 allocates a root node and uses the root node as a leaf node (S262).

Then, the file server 24 determines whether or not the node is a branch node (S263). When the node is a branch node, the file server 24 searches for an extent array with an offset (S264).

The file server 24 determines whether or not the branch node includes an extent 8S265) and proceeds to step S263 when there is an extent. When there is no extent, the file server selects a final extent (S266) and proceeds to step S263.

When the node is not a branch node in step S263, the file server 24 inserts an extent (S267) and determines whether or not a leaf node must be divided (S268). When the leaf node must be divided, the file server 24 divides the leaf node (S269) and proceeds to step S267. When dividing is not necessary, the process is ended.

Figure 26:
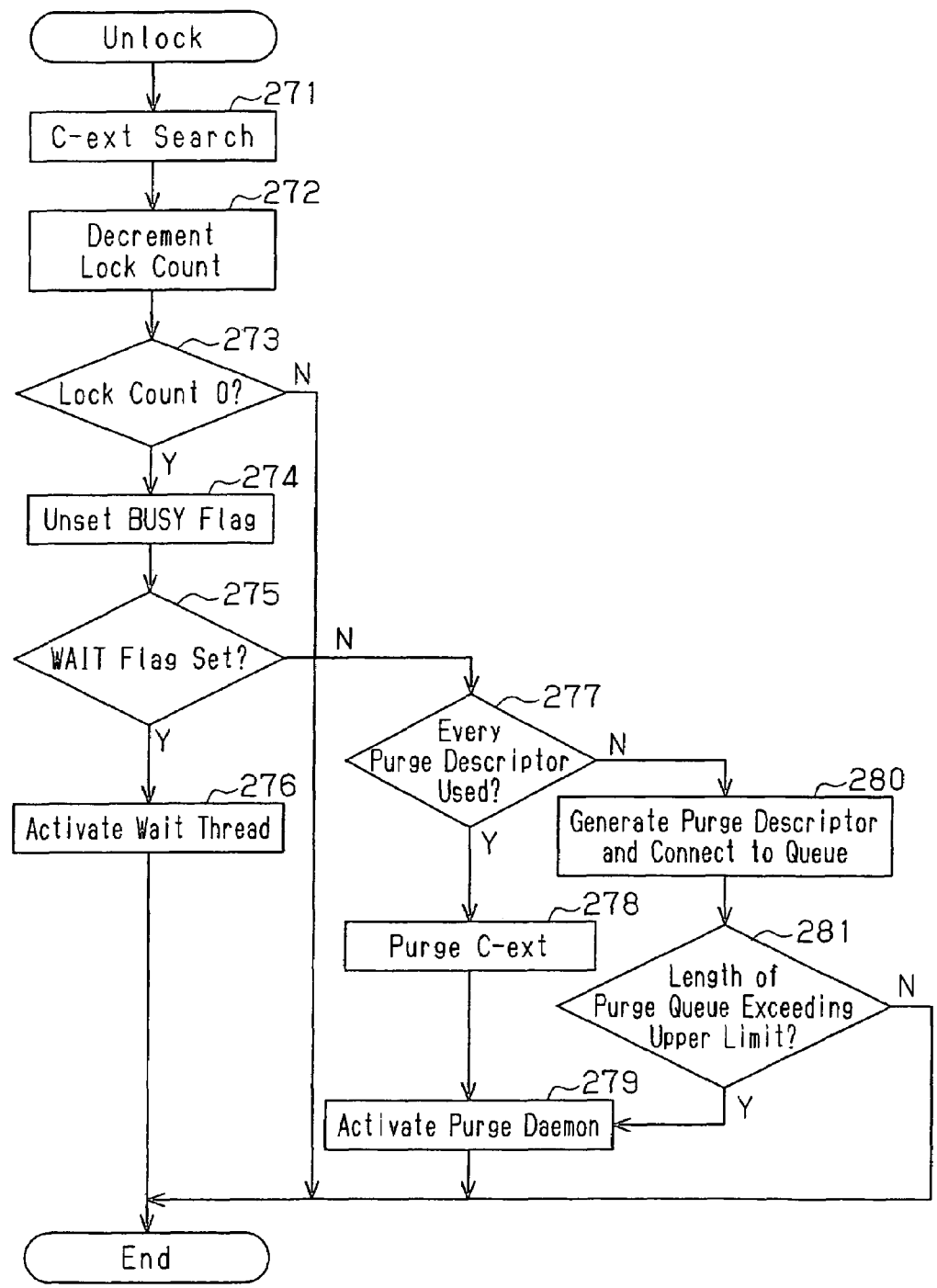
FIG. 26 is a flowchart of an unlock process.

An unlock process will now be discussed with reference to FIG. 26.

The unlock process is a process for releasing a cache extent locked by the query process and used in combination with the query process. The cache extent returned by the query process is in a locked state to exclude others (S206 in FIG. 21). The lock is released to enable the locked cache extent to be used by others.

The file server 24 searches for a cache extent (S271) and decrements a lock count (S272). The file server 24 then determines whether or not the lock count is "0" (zero) (S273). When the lock count is not "0", the file server 24 ends the process, and when the lock count is "0", the file server 24 unsets a BUSY flag (S274). Then, the file server 24 determines whether or not a WAIT flag is set (S275) and when the WAIT flag is set, a wait thread is set (S276).

When the WAIT flag is not set in step S275, the file server 24 determines whether or not every purge descriptor is being used (S277). Purge refers to canceling the mapping of a cache subject and a cache extent and returning cache extents. The purge descriptors holds information required for the purge process (information for searching the CEM).

Purge is enabled at the time point of "unlock". By suspending this as long as possible, a so-called "cache hit" is performed to process a "query" at a high speed for the same cache subject. The purge descriptors are used to suspend the purge.

A purge descriptor is generated at the time point of "unlock" and connected to an LRU list, and the purge descriptor at the head of the LRU list is processed at constant time intervals. A purge descriptor is removed from the LRU list by performing a "query" again before the purge descriptor is processed.

A purge descriptor is configured by a cache ID, an offset, a length, and addresses of entries in front and behind a list of a memory. The cache ID is one of a file ID, an object ID, and a storage ID. For example, the purge descriptor is shown as "0x100000005, 0x1000000, 0x8000, 0x6bef8f88, 0x0". In this example, 0x100000005 is the file ID, 0x1000000 is the offset, 0x8000 is the length, 0x6bef8f88 is the latter address on the list, and 0x0 is the former address on the list. This example is for a purge descriptor at the head of the LRU list.

The file server 24 purges the cache extent when every purge descriptor is being used (S278) and activates the purge daemon program (S279). When every purge descriptor is not being used, the file server 24 generates a purge descriptor and connects it to a queue (S280). The file server 24 determines whether or not the length of the purge queue exceeds an upper limit (reference value) (S281). When the length of the purge queue exceeds the upper limit, the file server 24 activates the purge daemon program in step S279. When the length does not exceed the upper limit, the file server 24 ends the process.

Figure 27:
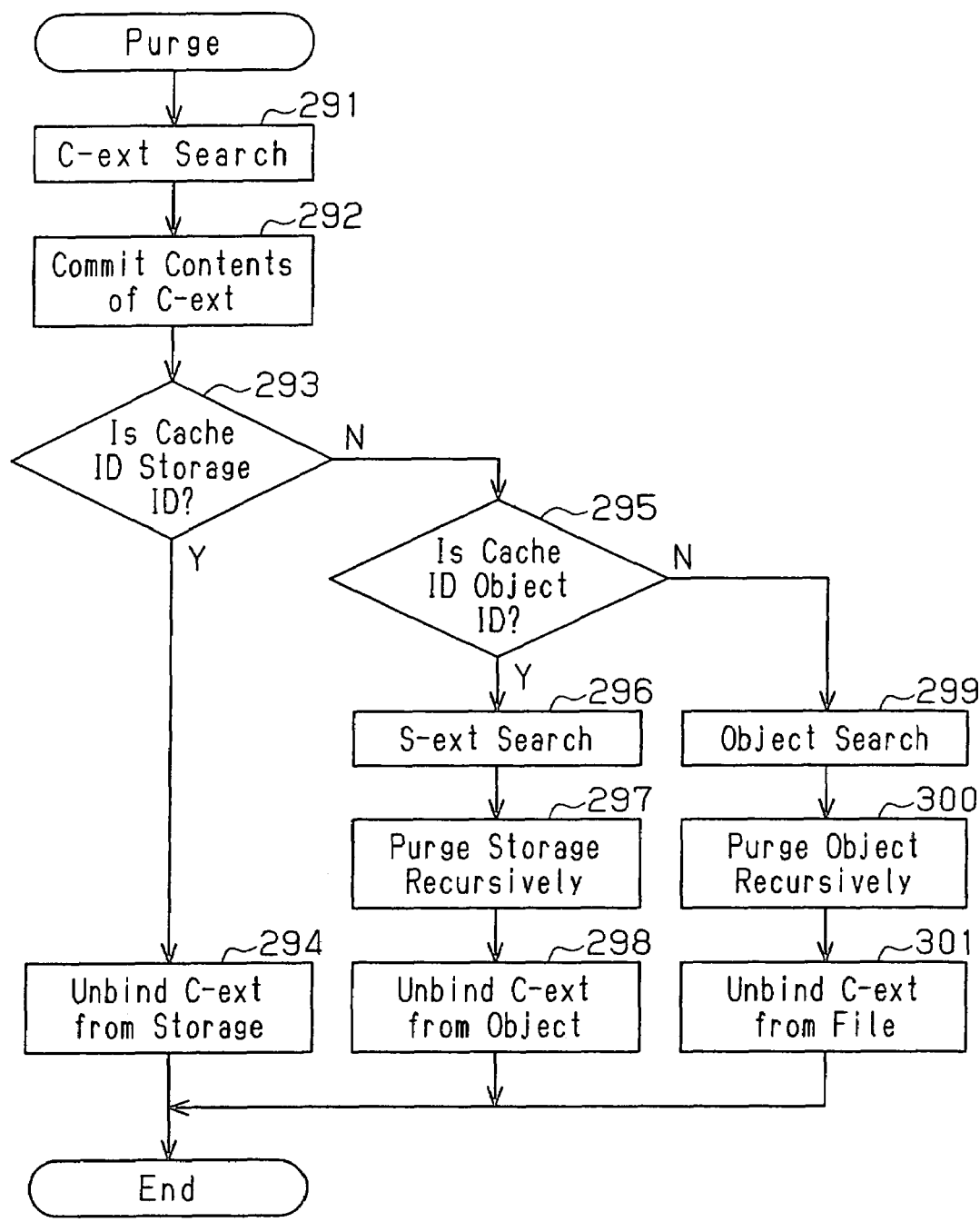
FIG. 27 is a flowchart of a purge process.

The purge process will now be discussed with reference to FIG. 27.

The file server 24 first searches for a cache extent (S291) and commits the contents of the cache extent (S292). Then, the file server 24 determines whether or not the cache ID is a storage ID (S293). When the cache ID is a storage ID, the file server unbinds the cache extent from the storage (S294) and ends the process.

When the cache ID is not a storage ID, the file server determines whether or not the cache ID is an object ID (S295). When the cache ID is an object ID, the file server 24 searches for a storage extent (S296), recursively purges the storage (S297), unbinds the object from the cache extent (S298), and ends the process.

When the cache ID is not an object ID, the file server 24 searches for an object (S299), recursively purges the object (S300), unbinds a cache extent from a file (S301), and ends the process.

Figure 28:
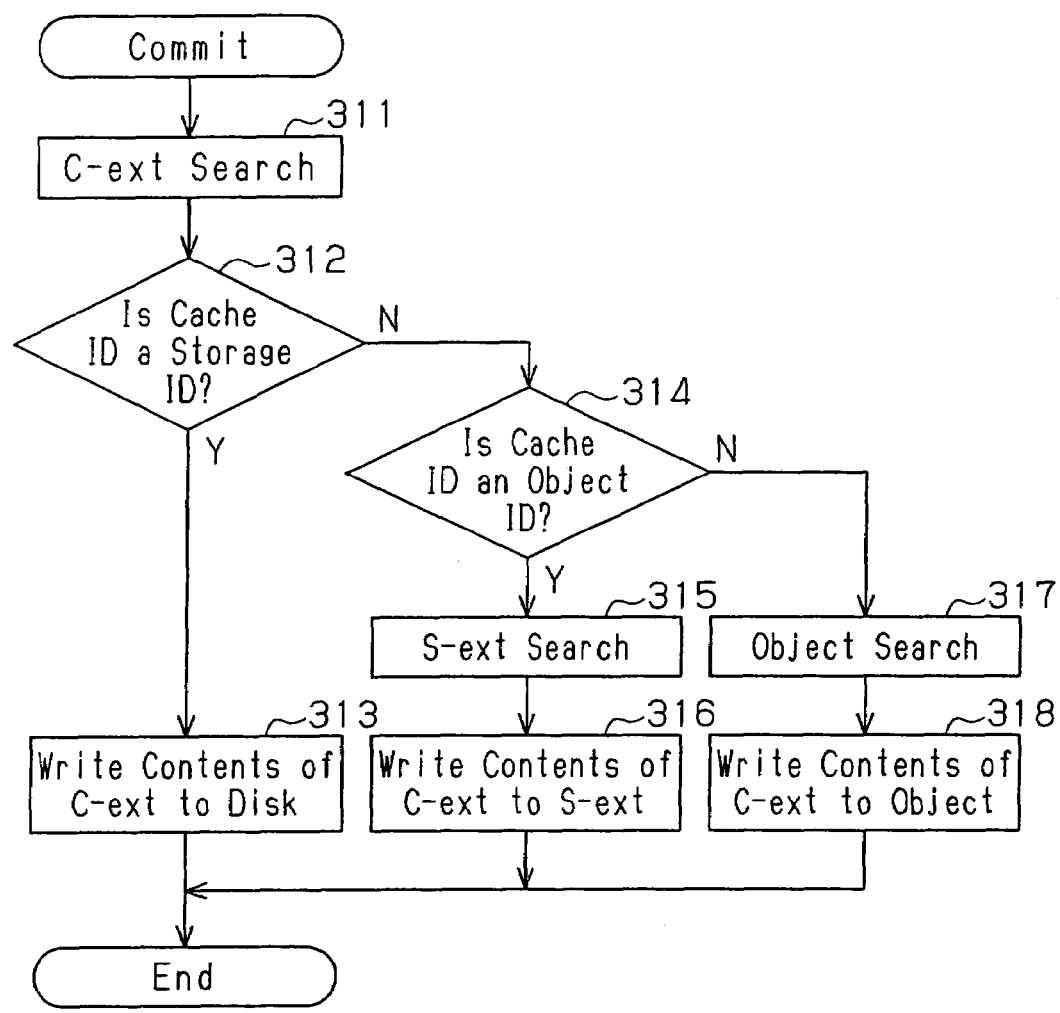
FIG. 28 is a flowchart of a commit process.

The commit process will now be discussed with reference to FIG. 28.

The file server 24 first searches for a cache extent (S311) and determines whether or not the cache ID is a storage ID (S312). When the cache ID is a storage ID, the file server writes the contents of a cache extent to a disk device 35 (S313) and then ends the process.

When the cache ID is not a storage ID, the cache ID determines whether or not the cache ID is an object ID (S314). When the cache ID is an object ID, the file server searches for a storage extent (S315), writes the contents of a cache extent to a storage extent (S316), and ends the process.

When the cache ID is not an object ID, the file server 24 searches for an object (S317), writes the contents of a cache extent to the object (S318), and ends the process.

Figure 29:
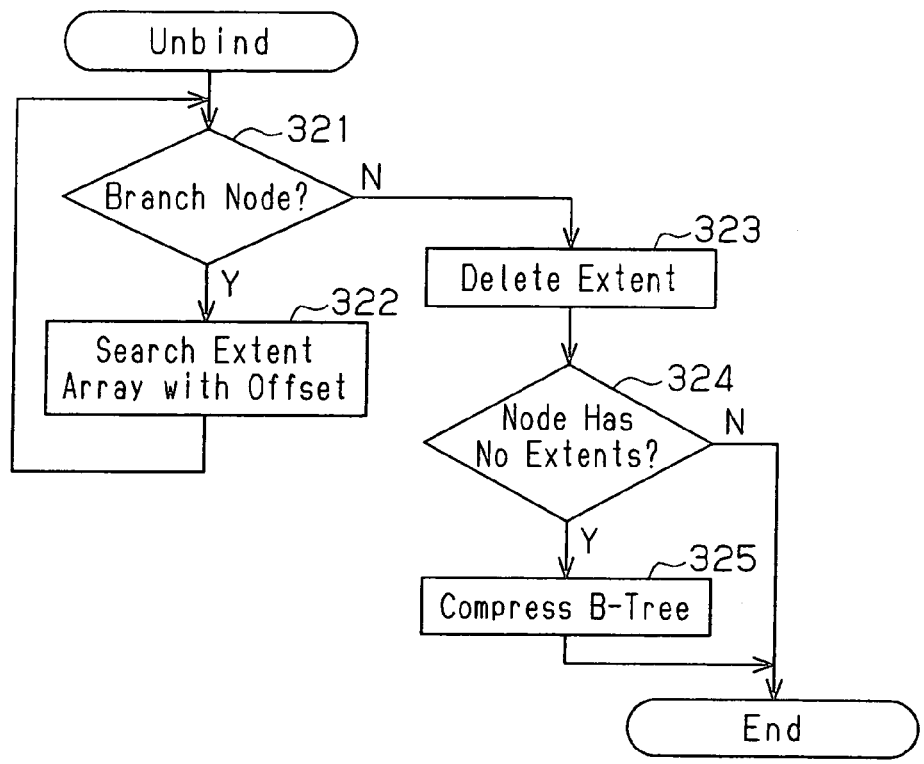
FIG. 29 is a flowchart of an unbind process.

An unbind process will now be discussed with reference to FIG. 29.

The file server 24 determines whether or not the node is a branch node (S321), searches for an extent array with an offset when the node is a branch node (S322), and proceeds to step S321.

When the node is not a branch node, the file server 24 deletes the extent (S323), determines whether or not the node has an extent (S324), compresses the B-tree when there is no extent (S325), and ends the process. The file server 24 also ends the process when the node does not have an extent.

Figure 30:
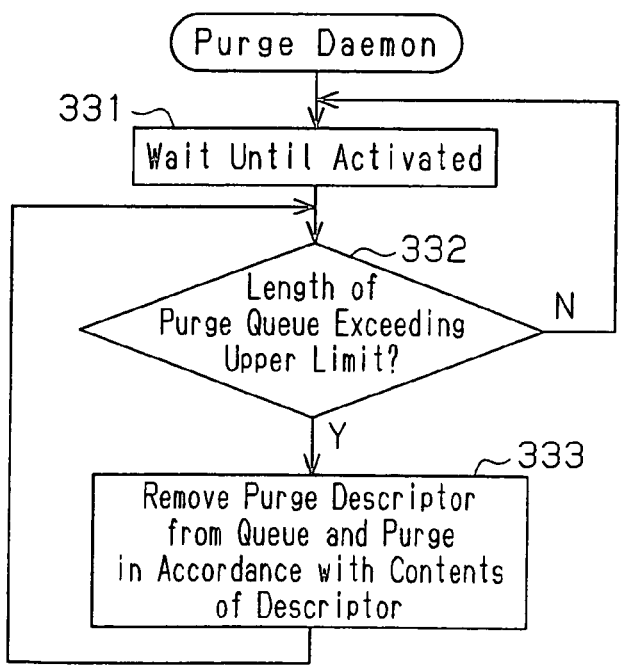
FIG. 30 is a flowchart of a purge daemon process.

A purge daemon process will now be discussed with reference to FIG. 30.

The file server 24 (CPU 31) waits until activated (S331) and determines whether the length of a purge queue is exceeding an upper limit (S332). When the length of the purge queue is exceeding the upper limit, the file server 24 removes the purge descriptor from the queue and performs purging in accordance with the contents of the descriptor (S333), proceeds to step S332, and waits until activated again if the length does not exceed the upper limit.

Figure 31:
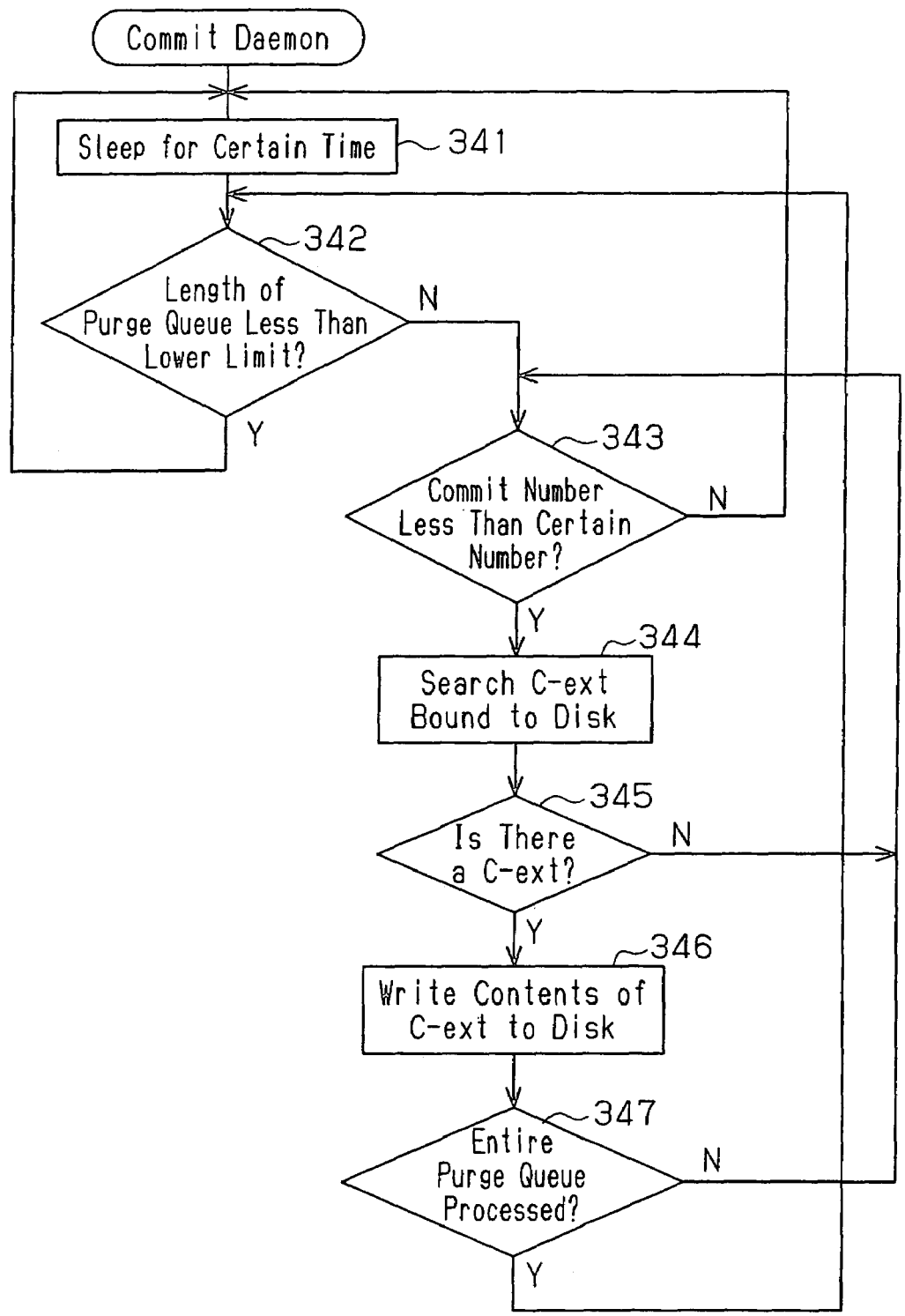
FIG. 31 is a flowchart of a commit daemon process.

The commit daemon process will now be discussed with reference to FIG. 31.

The file server 24 (CPU 31) sleeps for a certain period (S341), determines whether or not the length of the purge queue is less than a lower limit (reference value) (S342), and sleeps when the length is less than the lower limit.

When the purge queue length is greater than or equal to the lower limit, the file server 24 determines whether the commit number is a certain number or less (S343). When the length is greater than or equal to the purge queue length, the file server 24 searches for a cache extent bound by the disk device 35 (S344). The file server 24 determines whether or not there is a cache extent (S345). When there is a cache extent, the file server 24 writes the contents of the cache extent to the disk device 35 (S346). Then, the file server 24 determines whether or not the entire purge queue has been processed (whether or not every cache extent connected to the purge queue has been processed) (S347). If the entire purge queue has been processed, the file server 24 proceeds to step S342. When the entire purge queue has not been processed and when there are no cache extents (S345), the file server 24 proceeds to step S343.

The preferred embodiment has the advantages described below.

(1) The MBC manager 42 of the file server 24 manages the cache memory 44 as a group of plural extents. An object is configured from a disk block of the disk device 35. In a hierarchical structure in which a file is configured by objects, the MBC manager 42 generates a cache ID formed from an object identification that identifies objects in each hierarchical level. Further, a table is generated in each hierarchical level to manage a cache header for holding the binding of a cache ID and a cache extent in a cache ID with a unique key. When the contents of the disk device 35 are accessed, the cache header table is searched with the cache ID of the accessed object and the key. Since the cache memory corresponding to each object (file, object, disk block) is unnecessary, data does not have to be copied between cache memories. This decreases the cache control load.

Figure 32:
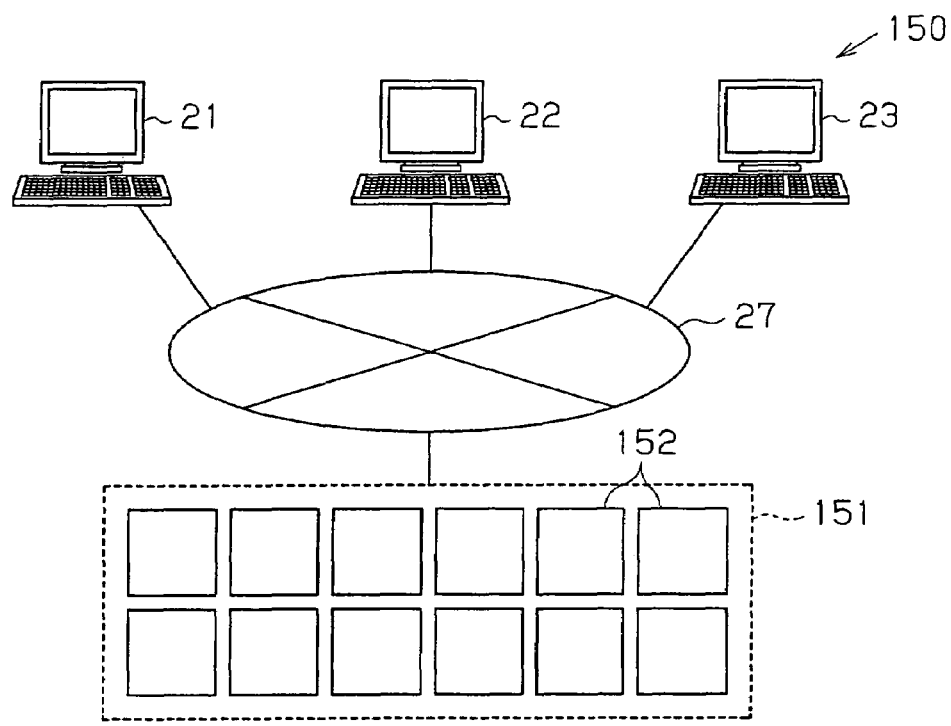
FIGS. 32 to 34 are schematic diagrams showing a further network system.
Figure 33:
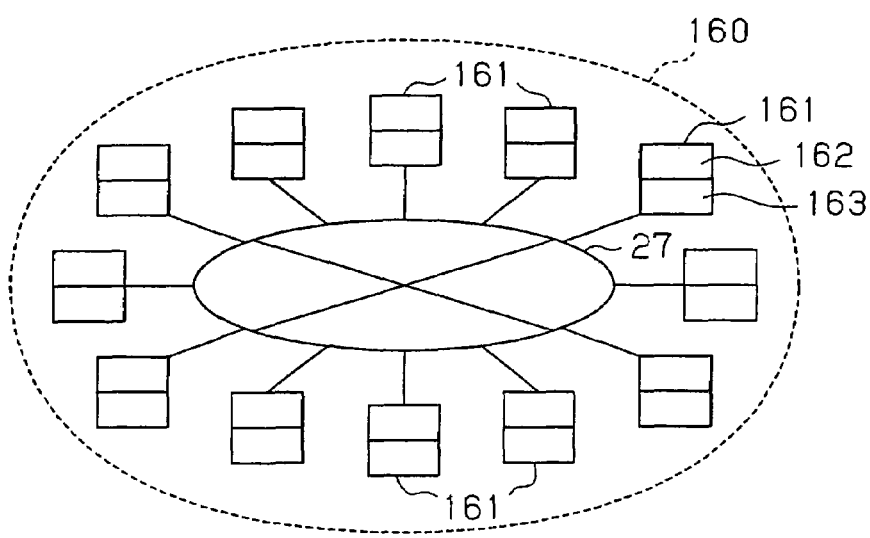
Figure 34:
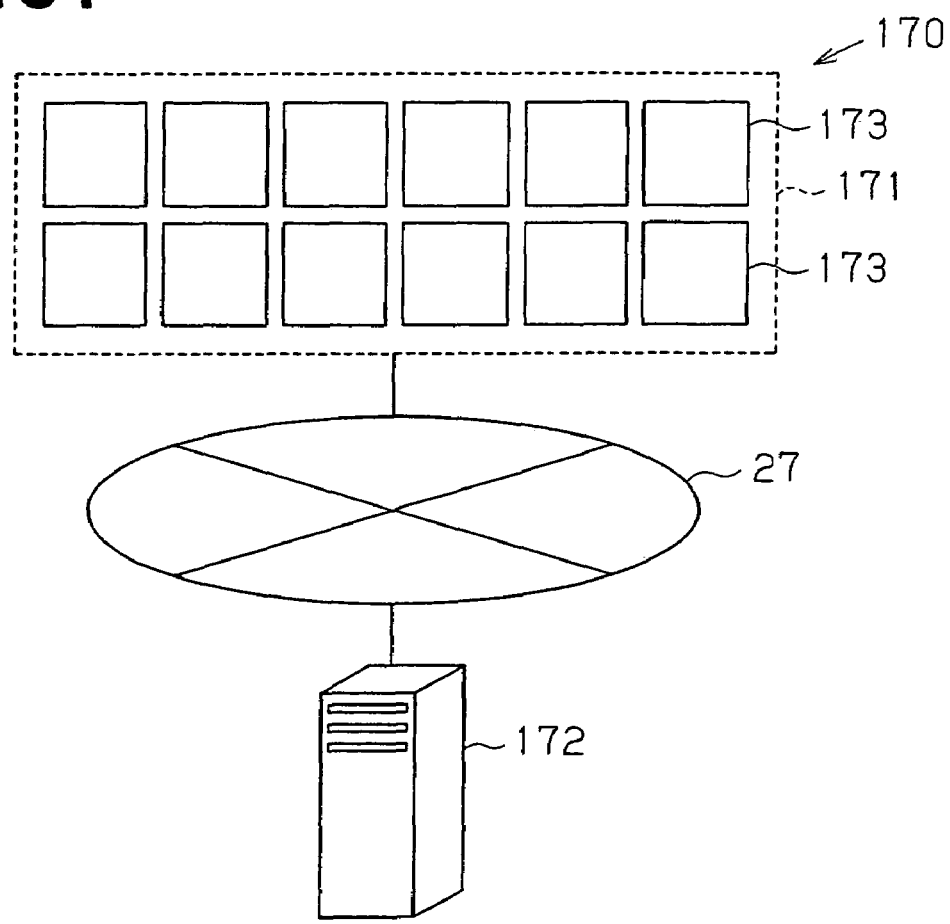

The file servers 24 to 26 of the preferred embodiment may be used in other network systems such as those of FIGS. 32 to 34.

FIG. 32 shows a network system 150 for a high speed, large capacity database. The network system 150 includes a plurality of (three in FIG. 32) client machines 21, 22, and 23 and a server cluster system 151 connected to one another by a network 27. The server cluster system 151 includes a plurality of (twelve in FIG. 32) file servers 152. The file servers 152 have substantially the same functions as the file servers 24 to 26 of the preferred embodiment and are referred to as nodes. The number of nodes is determined by the input/output capacity requirements of the system 150. In the system 150, objects of a database (file) are dispersed at nodes of the server cluster system 151. In such structure, the large capacity database is accessed at high speeds.

FIG. 33 shows a cluster system 160. The system 160 is formed by connecting a plurality of (twelve in FIG. 33) nodes 161 to a network 27. Each node 161 includes a client machine 162 and a file server 163. Accordingly, the nodes 161 have substantially the same function. The entire cluster system 160 configures a file system view. An object is redundantly arranged for each node 161. That is, substantially the same objects are arranged for the nodes 161 (the objects are copied). Thus, even if one or more nodes 161 malfunctions, the operation of the system 160 is not affected as long as objects having the same function are arranged in other nodes. In other words, the number of nodes and the redundancy of the object arrangement increase the operation rate and enables node malfunctions to be coped with.

FIG. 34 shows a parallel calculation system 170. The system 170 includes a client system 171 and a file server 172 connected to each other by a network 27. The client system 171 includes a plurality of calculation nodes 173 (twelve in FIG. 34). The calculation nodes 173 operate in parallel to each other. Accordingly, the processing of a file stored in the file server 172 is shared between the calculation nodes 173. That is, the processing range of each calculation node 173 is set to significantly reduce the calculation process time.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A cache control program to be executed by a file controller including a disk device that records a plurality of objects accessed by a client machine and a cache section that stores a copy of at least one of the objects, wherein when the client machine tries to access one of the objects recorded in the disk device, the file controller sends the copy of said object to the client machine if the copy of said object is in the cache section, and wherein each object is one of a primary object, a secondary object, and a tertiary object, the tertiary object being configured by at least one secondary object, the secondary object being configured by at least one primary object, and the primary, secondary, and tertiary objects configuring different hierarchical levels, the cache control program controlling the file controller, the cache control program when executed comprising the steps of:

managing the cache section as a plurality of cache extents;

generating a plurality of cache IDs, each including a hierarchical level of an object and an object identification used to identify the objects of each hierarchical level from each other;

generating a cache header table indicating the relation of the cache IDs and the cache extents in each hierarchical level, wherein the cache header table contains cache headers that hold the cache IDs and a plurality of keys, each being unique and used for one of the cache IDs; and searching the cache header table when the client machine tries to access one of the objects recorded in the disk device with the cache ID and the key of said object.

2. The program according to claim 1, further comprising the step of:

binding a cache extent that is bound with a primary object with cache extents of the secondary and tertiary objects corresponding to the cache extent of said primary object based on the cache header of each hierarchical level.

3. The program according to claim 1, further comprising the steps of:

storing a map for binding the objects of different hierarchical levels; and searching the objects of different hierarchical level with reference to the map.

4. The program according to claim 1, wherein the table is formed from a plurality of blocks, each configured by a plurality of entries, the program further comprising the steps of:

generating a map for managing the cache extents with the entries; and searching the map in response to an access by the client machine.

5. The program according to claim 1, wherein the client machine and the file controller are connected to a network having a plurality of nodes, the file controller being one of the nodes, and each of the cache IDs includes an identification number of a node in a certain domain of the network, the program further comprising the step of:

distributing the cache header table between the nodes through the network.

6. A cache control method performed by a file controller including a disk device that records a plurality of objects accessed by a client machine and a cache section that stores a copy of at least one of the objects, wherein when the client machine tries to access one of the objects recorded in the disk device, the file controller sends the copy of said object to the client machine if the copy of said object is in the cache section, and wherein each object is one of a primary object, a secondary object, and a tertiary object, the tertiary object being configured by at least one secondary object, the secondary object being configured by at least one primary object, and the primary, secondary, and tertiary objects configuring different hierarchical levels, the cache control method comprising the steps of:

managing the cache section as a plurality of cache extents;

generating a plurality of cache IDs, each including a hierarchical level of an object and an object identification used to distinguish the objects of each hierarchical level from each other;

generating a cache header table indicating the relation of the cache IDs and the cache extents in each hierarchical level, wherein the cache header table contains cache headers that hold the cache IDs and a plurality of keys, each being unique and used for one of the cache IDs; and searching the cache header table when the client machine tries to access one of the objects recorded in the disk device with the cache ID and the key of said object.

7. A file controller for use with a client machine, the file controller including a disk device that records a plurality of objects accessed by the client machine and a cache section that stores a copy of at least one of the objects, wherein when the client machine tries to access one of the objects recorded in the disk device, and the copy of said object is sent to the client machine if the copy of said object is in the cache section, and wherein each object is one of a primary object, a secondary object, and a tertiary object, the tertiary object being configured by at least one secondary object, the secondary object being configured by at least one primary object, and the primary, secondary, and tertiary objects configuring different hierarchical levels, the file controller including control logic which when executed performs steps comprising:

managing the cache section as a plurality of cache extents;

generating a plurality of cache IDs, each including a hierarchical level of an object and an object identification used to identify the objects of each hierarchical level from each other;

generating a cache header table indicating the relation of the cache IDs and the cache extents in each hierarchical level, wherein the cache header table contains cache headers that hold the cache IDs and a plurality of keys, each being unique and used for one of the cache IDs; and searching the cache header table when the client machine tries to access one of the objects recorded in the disk device with the cache ID and the key of said object.

8. A recording medium encoded with a cache control program for execution by a file controller including a disk device that records a plurality of objects accessed by a client machine and a cache section that stores a copy of at least one of the objects, wherein when the client machine tries to access one of the objects recorded in the disk device, the file controller sends the copy of said object to the client machine if the copy of said object is in the cache section, and wherein each object is one of a primary object, a secondary object, and a tertiary object, the tertiary object being configured by at least one secondary object, the secondary object being configured by at least one primary object, and the primary, secondary, and tertiary objects configuring different hierarchical levels, the cache control program controlling the file controller, the cache control program when executed performing the steps comprising:

managing the cache section as a plurality of cache extents;

generating a plurality of cache IDs, each including a hierarchical level of an object and an object identification used to identify the objects of each hierarchical level from each other;

generating a cache header table indicating the relation of the cache IDs and the cache extents in each hierarchical level, wherein the cache header table contains cache headers that hold the cache IDs and a plurality of keys, each being unique and used for one of the cache IDs; and searching the cache header table when the client machine tries to access one of the objects recorded in the disk device with the cache ID and the key of said object.

9. A cache control method for a file transferred through a network between a client machine and a plurality of file servers, each of the file servers including storage for storing the file and a cache memory having a plurality of cache extents, the method comprising:

dividing the file in accordance with the size of the file into a plurality of objects;

dispersing each of the objects to one of the file servers;

dividing the corresponding object into a plurality of disk blocks in each file server and storing the disk blocks in the storage of the file server;

copying at least one of the disk blocks related with the file in each file server, when the file is read, onto at least one cache extent of the cache memory of the file server while generating a table for binding the cache extent of at least one of the disk blocks, the objects, and the file to one another;

referring to the table with each file server to check whether the cache memory of each file server has a cache extent bound to the file when the client machine tries to access the file; and accessing the cache extent with each server when there is a cache extent bound to the file.

10. The method according to claim 9, wherein the table includes:

an object table indicating the relation of the file and the objects;

a storage extent table indicating the relation of each object and the disk blocks; and a cache header table indicating the relation of the cache extents and the file, the relation of the cache extents and the objects, and the relation of the cache extents and the disk blocks.

* * * * *